United States Patent
Morita et al.

(10) Patent No.: US 9,423,726 B2
(45) Date of Patent: Aug. 23, 2016

(54) DRIVE TRANSMITTER, DRIVING DEVICE INCORPORATING THE DRIVE TRANSMITTER, AND IMAGE FORMING APPARATUS INCORPORATING THE DRIVING DEVICE

(71) Applicants: Yoshiaki Morita, Kanagawa (JP); Ryo Hasegawa, Kanagawa (JP)

(72) Inventors: Yoshiaki Morita, Kanagawa (JP); Ryo Hasegawa, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/868,751

(22) Filed: Sep. 29, 2015

(65) Prior Publication Data
US 2016/0091837 A1    Mar. 31, 2016

(30) Foreign Application Priority Data
Sep. 29, 2014  (JP) ................... 2014-198823

(51) Int. Cl.
| G03G 15/16 | (2006.01) |
| G03G 15/01 | (2006.01) |
| G03G 21/16 | (2006.01) |
| F16D 7/04  | (2006.01) |

(52) U.S. Cl.
CPC ........... *G03G 15/1615* (2013.01); *F16D 7/044* (2013.01); *G03G 15/0131* (2013.01); *G03G 21/1647* (2013.01); *G03G 2221/1657* (2013.01)

(58) Field of Classification Search
CPC ........... G03G 15/1615; G03G 15/757; G03G 21/1857; G03G 2215/00156; G03G 2215/1657; F16D 7/044
See application file for complete search history.

(56) References Cited

U.S. PATENT DOCUMENTS

| 2007/0119280 A1* | 5/2007 | Takahashi ............... F16D 7/044 81/152 |
| 2010/0189475 A1* | 7/2010 | Atwood ............. G03G 15/0131 399/302 |
| 2010/0247144 A1* | 9/2010 | Kaneyama ........... G03G 15/161 399/121 |
| 2010/0310292 A1* | 12/2010 | Furukawa ............ G03G 15/161 399/381 |
| 2011/0249986 A1* | 10/2011 | Nakano ................ G03G 15/161 399/121 |
| 2013/0071150 A1* | 3/2013 | Takagi ............... G03G 15/0189 399/302 |
| 2014/0140729 A1 | 5/2014 | Morita |
| 2015/0043928 A1 | 2/2015 | Konishi et al. |
| 2015/0050080 A1 | 2/2015 | Morita et al. |

FOREIGN PATENT DOCUMENTS

| JP | 10-326034 | 12/1998 |
| JP | 2012-155306 | 8/2012 |
| JP | 2013-064763 | 4/2013 |
| JP | 2014-102435 | 6/2014 |

\* cited by examiner

*Primary Examiner* — Rodney Bonnette
(74) *Attorney, Agent, or Firm* — Oblon, McClelland, Maier & Neustadt, L.L.P

(57) ABSTRACT

A drive transmitter, which can included in a driving device and an image forming apparatus, includes a drive transmitter including a drive coupling and a driven coupling. The drive coupling is mounted on a drive output shaft to which a driving force is transmitted and includes a drive claw projecting in an axial direction. The driven coupling is mounted on a driven shaft, faces the drive coupling in the axial direction, and includes a driven claw projecting in the axial direction. A height of at least one of the drive claw and the driven claw in the axial direction gradually decreasing from one end to the other end in a rotation direction of at least one of the drive coupling and the driven coupling. The drive claw and the driven claw come into either one of line contact and point contact with each other in the axial direction.

15 Claims, 21 Drawing Sheets

DRIVE TRANSMITTER, DRIVING DEVICE INCORPORATING THE DRIVE TRANSMITTER, AND IMAGE FORMING APPARATUS INCORPORATING THE DRIVING DEVICE

CROSS-REFERENCE TO RELATED APPLICATIONS

This patent application is based on and claims priority pursuant to 35 U.S.C. §119(a) to Japanese Patent Application No. 2014-198823, filed on Sep. 29, 2014, in the Japan Patent Office, the entire disclosure of which is incorporated by reference herein.

BACKGROUND

1. Technical Field

This disclosure relates to a drive transmitter, a driving device incorporating the drive transmitter, and an image forming apparatus incorporating the driving device.

2. Related Art

An electrophotographic image forming apparatus includes rotary bodies such as a photoconductor and a developing roller, and forms an image by driving the rotary bodies for rotation. Many of the rotary bodies are designed to be detachably attached to an apparatus body for the purpose of replacement. Hence, a drive transmitter that transmits driving force from a drive source of the apparatus body to the rotary body is provided with a coupling as a drive transmitter that connects both of them detachably.

A known coupling that functions as a drive transmitter includes a drive joint that functions as a drive coupling provided at an end of a drive output shaft, and a driven joint that functions as a driven coupling provided at an end of a rotation shaft, which is a driven shaft, of a drive target rotator. When the drive joint transmits the driving force to the driven joint, a drive claw provided to the drive joint and projecting in the axial direction comes into contact with a driven claw, which projects in the axial direction, of the driven joint to transmit the driving force to the driven joint.

The drive claw of the drive joint projects in the axial direction from a drive base mounted on the drive output shaft of the drive joint, and has a predetermined length in the rotation direction. A drive transmission portion that transmits a driving force at one end of the drive claw in the rotation direction in contact with the driven claw is a face perpendicular to the rotation direction. Moreover, the drive claw gradually reduces the height in the axial direction from the one end to the other end in the rotation direction. In other words, a far end face of the drive claw, which is an opposing face opposed to the driven joint, is an inclined face. The drive joint is provided with two drive claws having the above-described, spaced 180 degrees apart in the rotation direction.

When the drive target rotator is moved in the axial direction to attach the drive target rotator to the apparatus body, the driven coupling provided at the end of the rotation shaft of the drive target rotator approaches the drive coupling in the axial direction. The driven claws of the driven coupling then enter between the drive claws of the drive coupling.

Generally, the drive joint that functions a drive coupling and the driven joint that functions a driven coupling normally have the same shape in terms of costs and the like.

SUMMARY

At least one aspect of this disclosure provides a drive transmitter including a drive coupling and a driven coupling. The drive coupling is mounted on an end of a drive output shaft to which a driving force of a drive source is transmitted and includes a drive claw projecting in an axial direction. The driven coupling is mounted on an end of a driven shaft, faces the drive coupling in the axial direction, and includes a driven claw projecting in the axial direction. A height of at least one of the drive claw and the driven claw in the axial direction gradually decreases from one end to the other end in a rotation direction of at least one of the drive coupling and the driven coupling. The drive claw and the driven claw come into either one of line contact and point contact with each other in the axial direction.

Further, at least one aspect of this disclosure provides a driving device including a drive source and the above-described drive transmitter to transmit the driving force of the drive source to a drive target rotator.

Further, at least one aspect on this disclosure provides an image forming apparatus including an apparatus body and the above-described driving device included in the apparatus body.

DETAILED DESCRIPTION

Figure 1:
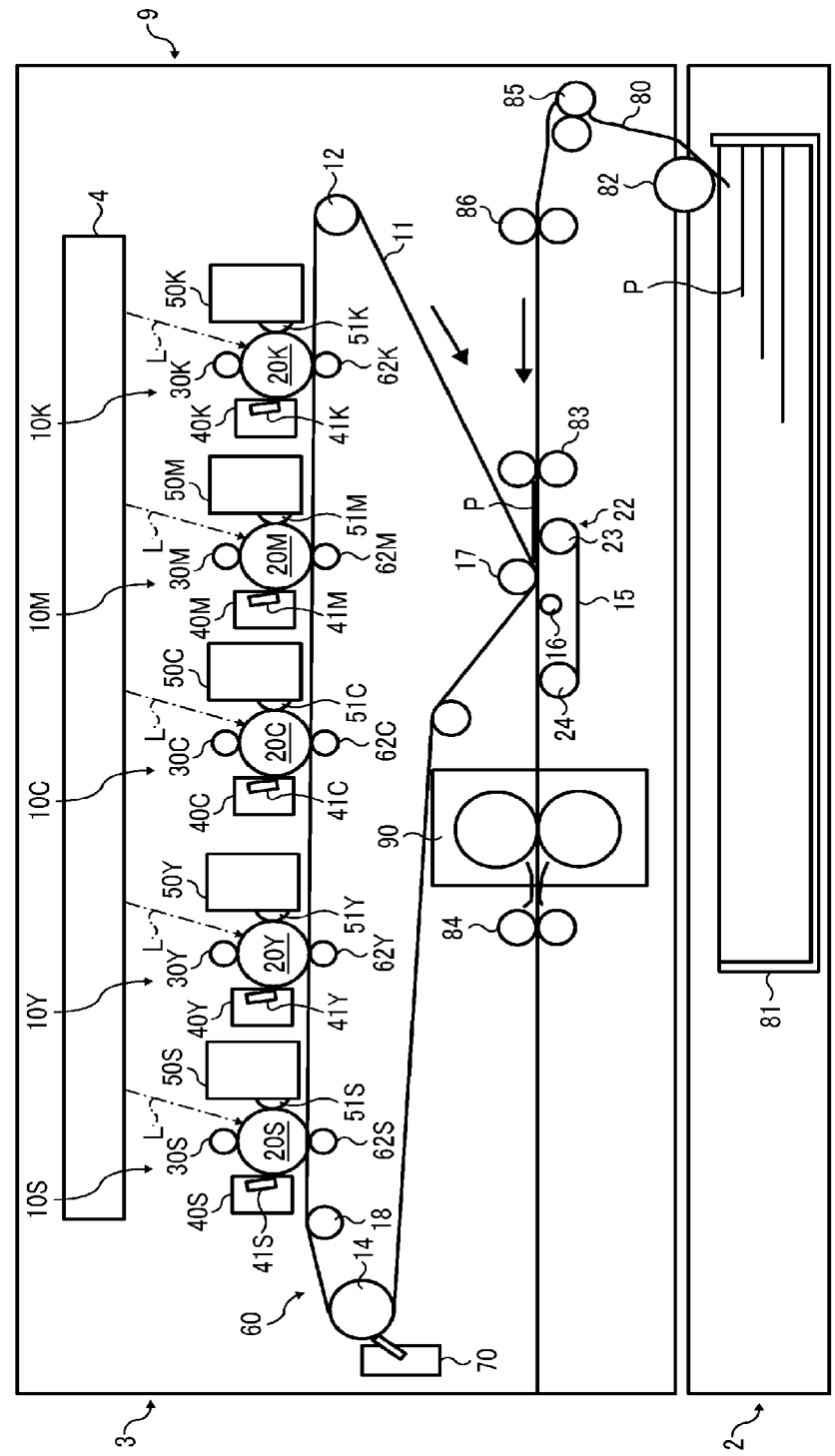
FIG. 1 is a schematic view illustrating an entire configuration of an image forming apparatus according to an example of the present disclosure.

It will be understood that if an element or layer is referred to as being "on", "against", "connected to" or "coupled to" another element or layer, then it can be directly on, against, connected or coupled to the other element or layer, or intervening elements or layers may be present. In contrast, if an element is referred to as being "directly on", "directly connected to" or "directly coupled to" another element or layer, then there are no intervening elements or layers present. Like numbers referred to like elements throughout. As used herein, the term "and/or" includes any and all combinations of one or more of the associated listed items.

Spatially relative terms, such as "beneath", "below", "lower", "above", "upper" and the like may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements describes as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors herein interpreted accordingly.

Although the terms first, second, etc. may be used herein to describe various elements, components, regions, layers and/or sections, it should be understood that these elements, components, regions, layer and/or sections should not be limited by these terms. These terms are used to distinguish one element, component, region, layer or section from another region, layer or section. Thus, a first element, component, region, layer or section discussed below could be termed a second element, component, region, layer or section without departing from the teachings of the present disclosure.

The terminology used herein is for describing particular embodiments and examples and is not intended to be limiting of exemplary embodiments of this disclosure. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Descriptions are given, with reference to the accompanying drawings, of examples, exemplary embodiments, modification of exemplary embodiments, etc., of an image forming apparatus according to exemplary embodiments of this disclosure. Elements having the same functions and shapes are denoted by the same reference numerals throughout the specification and redundant descriptions are omitted. Elements that do not demand descriptions may be omitted from the drawings as a matter of convenience. Reference numerals of elements extracted from the patent publications are in parentheses so as to be distinguished from those of exemplary embodiments of this disclosure.

This disclosure is applicable to any image forming apparatus, and is implemented in the most effective manner in an electrophotographic image forming apparatus.

In describing preferred embodiments illustrated in the drawings, specific terminology is employed for the sake of clarity. However, the disclosure of this disclosure is not intended to be limited to the specific terminology so selected and it is to be understood that each specific element includes any and all technical equivalents that have the same function, operate in a similar manner, and achieve a similar result.

Referring now to the drawings, wherein like reference numerals designate identical or corresponding parts throughout the several views, preferred embodiments of this disclosure are described.

Next, a description is given of a configuration of an image forming apparatus 1 according to an example of this disclosure, with reference to FIG. 1.

Examples of this disclosure are described hereinafter with reference to the drawings. FIG. 1 is a schematic view illustrating an example of an entire configuration of the image forming apparatus 1 according to an example of this disclosure. The image forming apparatus 1 illustrated in FIG. 1 is a system where image forming units 10 functioning as image forming units or process cartridges are arranged side by side, and images are temporarily transferred in layers on a surface of an intermediate transfer belt 11 that is an intermediate transfer body functioning as a transfer body to be collectively transferred onto a recording sheet P.

As illustrated in FIG. 1, the image forming apparatus 1 includes a printing device 3 that forms toner images and a sheet feeding device 2 that stores and feeds the recording sheets P.

The image forming apparatus 1 may be a copier, a printer, a scanner, a facsimile machine, a plotter, and a multifunction peripheral or a multifunction printer (MFP) having at least one of copying, printing, scanning, facsimile, and plotter functions, or the like. According to the present example, the image forming apparatus 1 is an electrophotographic printer that forms toner images on a sheet or sheets by electrophotography.

More specifically, the image forming apparatus 1 functions as a printer. However, the image forming apparatus 1 can expand its function as a copier by adding a scanner as an option disposed on top of an apparatus body 9 of the image forming apparatus 1. The image forming apparatus 1 can further obtain functions as a facsimile machine by adding an optional facsimile substrate in the apparatus body 9 of the image forming apparatus 1.

Further, this disclosure is also applicable to image forming apparatuses adapted to form images through other schemes, such as known ink jet schemes, known toner projection schemes, or the like as well as to image forming apparatuses adapted to form images through electro-photographic schemes.

The printing device 3 includes image forming units 10Y, 10C, 10M, and 10K for color image formation, which are provided for a plurality of standard color toners such as yellow (Y) toner, cyan (C) toner, magenta (M) toner, and black (K) toner. Moreover, for example, the printing device 3 includes a special color image forming unit 10S provided for a special color toner (S) such as clear toner that is colorless and transparent toner. The printing device 3 has a tandem configuration where these image forming units 10S, 10Y, 10C, 10M, and 10K are arranged side by side in a substantially horizontal direction.

The clear toner covers the respective surfaces of the color toner images such as yellow, magenta, cyan, and black toner images. Accordingly, an overcoat layer of the clear toner acts as a protection for the surfaces of the color toner images. Another action of the clear toner is to provide texture like textured paper by creating a pattern on the recording sheet P having a smooth surface with the clear toner.

Another imaging order is also conceivable for an imaging order of the clear toner. The imaging order is not particularly limited to the example described herein. Moreover, it may be a configuration using a white toner instead of the clear toner.

In the configuration using a white toner as the special color toner instead of the clear toner S, at least one color toner out of the yellow, magenta, cyan, and black color toners is used on an image formation surface of a transparent recording medium that functions as a transparent sheet to form a color toner image. The white toner is then used on the color toner image to form a white toner image. Consequently, when the color toner image is viewed from a surface opposite to the image formation surface of the transparent sheet on which the color toner image has been formed, the color toner image is not seen through, and also it is possible to make a uniform-gloss and high-value-added print due to a gloss of the transparent sheet.

An exposure device 4 that functions as a latent image forming device to expose the surfaces of photoconductors 20S, 20Y, 20C, 20M, and 20K to emit light based on image data of the colors to form electrostatic latent images is provided above the image forming units 10S, 10Y, 10C, 10M, and 10K.

Moreover, an intermediate transfer device 60 including the endless belt type intermediate transfer belt 11 that is driven for rotation in a state of being looped over a drive roller 12, a tension roller 14, a driven roller 18, and the like is placed below the image forming units 10S, 10Y, 10C, 10M, and 10K.

All the image forming units 10S, 10Y, 10C, 10M, and 10K have a similar configuration. Accordingly, the suffixes or indications of the color codes, S, Y, C, M, and K are omitted hereinafter as appropriate.

The image forming unit 10 includes a photoconductor 20 that functions as an image bearer, and a charging roller 30 that functions as a charger that charges the surface of the photoconductor 20. Moreover, the image forming unit 10 includes a developing device 50 that feeds toner to and develops an electrostatic latent image formed on the photoconductor 20 by the exposure device 4 that functions as a latent image forming device irradiating the surface of the photoconductor 20 charged by the charging roller 30 with laser light L.

Furthermore, the image forming unit 10 includes a photoconductor cleaning device 40 that cleans the photoconductor surface with a cleaning blade 41 after the toner image has been transferred from the photoconductor 20 onto the intermediate transfer belt 11.

The charging roller 30 is connected to a power supply. A predetermined charge bias where a bias with an alternating current component is superimposed and applied to direct current is applied to the charging roller 30. The charging roller 30 is provided with a minute gap formed between with the photoconductor 20. Moreover, the charging roller 30 may be in contact with the photoconductor 20 and may not contact but close to the photoconductor 20.

The developing device 50 uses a two-component developer (hereinafter, simply referred to simply as the "developer") with magnetic carriers and toner. The developing device 50 is provided at an opposing position to develop the photoconductor 20 with the electrostatic latent image.

A developing roller 51 that functions as a developer bearer is placed for the developing device 50. The developer transported by the developing roller 51 is regulated to a given thickness of a developer layer by a developer regulator and then transported to the opposing position to the photoconductor 20. The toner in the developer held on the developing roller 51 is adhered to the electrostatic latent image formed on the photoconductor 20 to develop the electrostatic latent image.

Moreover, the image forming apparatus 1 is provided with a toner bottle for adding toner to the developing device 50. A predetermined addition amount of toner is added to each developing device 50 from the toner bottle through a toner conveying path.

The intermediate transfer device 60 includes the intermediate transfer belt 11 that has an endless loop and is driven for rotation in a state of being looped over the drive roller 12, the tension roller 14, and the driven roller 18. Furthermore, the intermediate transfer device 60 also includes primary transfer rollers 62S, 62Y, 62C, 62M, and 62K that primarily transfer the toner images on their respective photoconductors 20 onto the intermediate transfer belt 11. The primary transfer rollers 62S, 62Y, 62C, 62M, and 62K function as transfer members.

The primary transfer rollers 62 are respectively placed at respective positions opposed to the photoconductors 20 across the intermediate transfer belt 11. Each primary transfer roller 62 is connected to a power supply to be applied a predetermined primary transfer bias.

A secondary transfer device 22 is included opposite the printing device 3 across the intermediate transfer belt 11. The secondary transfer device 22 is disposed to rotatably loop a secondary transfer belt 15 over a secondary transfer roller 16 and tension rollers 23 and 24.

In the secondary transfer device 22, the secondary transfer belt 15 is pressed against a secondary transfer opposing roller 17 via the intermediate transfer belt 11 at a position supported by the secondary transfer roller 16. The secondary transfer device 22 that functions as a secondary transfer unit is placed to form a secondary transfer nip formed between the secondary transfer belt 15 and the intermediate transfer belt 11. Moreover, as in the primary transfer rollers 62, the secondary transfer roller 16 is connected to a power supply to apply a predetermined secondary transfer bias.

Moreover, the image forming apparatus 1 further includes an intermediate transfer belt cleaning device 70 to clean the surface of the intermediate transfer belt 11 after secondary transfer. Furthermore, the image forming apparatus 1 is provided with a lubricant applying device that applies a lubricant to the intermediate transfer belt 11.

Moreover, in the present example, roller adjusting devices 100 (see FIG. 2) are provided to bring the photoconductors 20 of the image forming units 10 into contact with or separated from the intermediate transfer belt 11. The roller adjusting devices 100 are adjusters to move the primary transfer rollers 62 that support the intermediate transfer belt 11 from its inner circumferential surface side, in directions to bring the primary transfer rollers 62 (i.e., the primary transfer rollers 62S, 62Y, 62C, 62M, and 62K) into contact with or separated from their corresponding photoconductors 20 (i.e., the photoconductors 20S, 20Y, 20C, 20M, and 20K).

The sheet feeding device 2 is provided in a lower portion of the image forming apparatuses 1. The sheet feeding device 2 includes a sheet feed tray 81 and a sheet feeding roller 82. The sheet feed tray 81 stores a bundle of a plurality of stacked recording sheets P. The sheet feeding roller 82 is in contact with the uppermost recording sheet P of the bundle of recording sheets stored in the sheet feed tray 81. The sheet feeding roller 82 is driven for rotation by a drive unit to send out the uppermost recording sheet P to a sheet conveying path 80.

The recording sheet P that is sent out to the sheet conveying path 80 is transported through the sheet conveying path 80 by paired sheet conveying rollers 85 and 86 provided to the sheet conveying path. A leading end of the recording sheet P is held between a registration roller pair 83. When the leading end of the recording sheet P has been held between the registration roller pair 83. Both rollers of the registration roller pair 83 rotate at an appropriate timing to send out the recording sheet P to the secondary transfer nip described below.

The image forming apparatus 1 further includes a fixing device 90 that fixes a toner image on the recording sheet P onto the recording sheet P. The fixing device 90 is disposed downstream from the secondary transfer nip in the sheet conveying direction. The fixing device 90 includes a fixing roller with a halogen heater therein, and a pressure roller placed opposed to and pressed against the fixing roller.

Next, a description is given of an image forming operation of the image forming apparatus 1 according to an example of this disclosure. The roller adjusting devices 100 are controlled in accordance with an image forming mode to bring the photoconductor 20 of the image forming unit 10 selected for the image forming mode into contact with the intermediate transfer belt 11, and to separate the photoconductor 20 of the image forming unit 10 that is not used in the image forming mode from the intermediate transfer belt 11.

The photoconductor 20 in contact with the intermediate transfer belt 11 is rotated by a drive unit in a counterclockwise direction in the figure. The surface of the rotating photoconductor 20 is uniformly charged by the charging roller 30 to a given polarity. The charged photoconductor surface is irradiated with scanning light from the exposure device 4. Consequently, an electrostatic latent image is formed on the surface of the photoconductor 20. Each color toner is added by the developing device 50 to the electrostatic latent image formed in this manner to make the electrostatic latent image visible as a toner image.

Moreover, the intermediate transfer belt 11 is also rotated in the counterclockwise direction in the figure, together with the rotation of the photoconductor 20. By so doing, the primary transfer rollers 62 primarily transfer the respective color toner images primarily transferred from the photoconductors 20 onto the intermediate transfer belt 11 by overlaying the color toner images onto each other.

On other hand, the recording sheet P is fed by the sheet feeding roller 82 from the sheet feed tray 81. When the leading end of the recording sheet P reaches the registration roller pair 83, the recording sheet P is detected by a sensor. The detection causes the registration roller pair 83 to send out the recording sheet P to the secondary transfer nip formed between the secondary transfer belt 15 and the intermediate transfer belt 11 in synchronization with movement of the toner image formed on the intermediate transfer belt 11.

By applying the secondary transfer bias to the secondary transfer roller 16 at the secondary transfer nip, a predetermined potential difference is generated between the secondary transfer opposing roller 17 and the secondary transfer roller 16 to form an electric field. The color toner image on the intermediate transfer belt 11 is secondarily transferred onto the recording sheet P.

The recording sheet P having the toner image secondarily transferred at the secondary transfer nip is sent to the fixing device 90 to fix the toner image onto the recording sheet P by application of heat and pressure when the recording sheet P passes through the fixing device 90. The recording sheet P having the fixed toner image is discharged by an sheet ejecting roller pair 84 to an ejection tray provided outside the apparatus. Thus, an image forming job for one sheet ends.

The photoconductor cleaning device 40 collects residual toner remaining on the surface of the photoconductor 20 therefrom the toner image has been transferred. The residual toner is then transported to a waste toner collection container. After having been cleaned by the photoconductor cleaning device 40, the surface of the photoconductor 20 is charged by the charging roller 30 afterward simultaneously with neutralization to be ready for the next imaging job.

Moreover, residual toner remaining on the intermediate transfer belt 11 is cleaned by the intermediate transfer belt cleaning device 70 for the next imaging job.

The image forming apparatus 1 of the present example includes five image forming modes, which are a, full color image forming mode, a monochromatic image forming mode, a special image forming mode, a full color and special image forming mode, and lubricant application mode.

Table 1 below shows summary of the image forming modes and states of the photoconductors 20S, 20Y, 20C, 20M, and 20K in contact or separation with respect to the primary transfer rollers 62S, 62Y, 62C, 62M, and 62K.

TABLE 1

| | | State of Primary Transfer Roller and Photoconductor | | |
| --- | --- | --- | --- | --- |
| | | Black Toner | Yellow, Magenta, Cyan Toners | Special Color Toner |
| Image Forming Mode | Full Color | In contact | In contact | Separated |
| | Monochrome (Black-and-White) Color | In contact | Separated | Separated |
| | Full Color and Special Color | In contact | In contact | In contact |
| | Special Color | Separated | Separated | In contact |
| | Lubricant Application | Separated | Separated | In contact |

The full color image forming mode is executed for a full color image forming operation with the yellow, cyan, magenta, and black color toners. In the full color image forming mode, the roller adjusting devices 100 bring the color primary transfer rollers 62Y, 62C, 62M, and 62K closer to the photoconductors 20Y, 20C, 20M, and 20K, respectively, and bring the intermediate transfer belt 11 into contact with the photoconductors 20Y, 20C, 20M, and 20K.

In terms of the special color image forming unit 10S that is not used in the full color image forming mode, the roller adjusting devices 100 separate the special color primary transfer roller 62S from the photoconductor 20S and separate the intermediate transfer belt 11 from the photoconductor 20S.

The monochromatic image forming mode is executed for a monochromatic image forming operation with the black (K) color toner. In the monochromatic image forming mode, the roller adjusting devices 100 bring the color primary transfer roller 62K closer to the photoconductor 20K, and bring the intermediate transfer belt 11 into contact with the photoconductor 20K.

In terms of the image forming units 10S, 10Y, 10C, and 10M that are not used in the monochromatic image forming mode, the roller adjusting devices 100 separate the primary transfer rollers 62S, 62Y, 62C, and 62M from the photoconductors 20S, 20Y, 20C, and 20M, respectively. Consequently, the intermediate transfer belt 11 is separated from the photoconductors 20S, 20Y, 20C, and 20M.

The special image forming mode is executed for an image forming operation with the clear toner S. In the special image forming mode, the roller adjusting devices 100 described below bring the special color primary transfer roller 62S closer to the special color photoconductor 20S and bring the intermediate transfer belt 11 into contact with the special color photoconductor 20S.

In terms of the image forming units 10Y, 10C, 10M, and 10K for color image formation that are not used in the special image forming mode, the roller adjusting devices 100 separate the color primary transfer rollers 62Y, 62C, 62M, and 62K from the photoconductors 20Y, 20C, 20M, and 20K, respectively. Consequently, the intermediate transfer belt 11 is separated from the photoconductors 20Y, 20C, 20M, and 20K.

The full color image and special color image forming mode is executed for an image forming operation with all the image forming units 10S, 10Y, 10C, 10M, and 10K. In the full color image and special color image forming mode, the roller adjusting devices 100 position the primary transfer rollers 62S, 62Y, 62C, 62M, and 62K at positions closer to the photoconductors 20S, 20Y, 20C, 20M, and 20K, respectively. The intermediate transfer belt 11 is then brought into contact with the photoconductors 20S, 20Y, 20C, 20M, and 20K.

The lubricant application mode is executed for an operation of rotating the intermediate transfer belt 11 to apply a lubricant to the surface of the intermediate transfer belt with the lubricant application device in a state where all the image forming units 10S, 10Y, 10C, 10M, and 10K are away from the intermediate transfer belt 11.

In the lubricant application mode, the roller adjusting devices 100 position the primary transfer rollers 62S, 62Y, 62C, 62M, and 62K at positions away from the photoconductors 20S, 20Y, 20C, 20M, and 20K, respectively. Consequently, the intermediate transfer belt 11 is separated from the photoconductors 20S, 20Y, 20C, 20M, and 20K.

Next, a description is given of the roller adjusting devices 100 that bring the special color primary transfer roller 62S into contact or separation.

Figure 2:
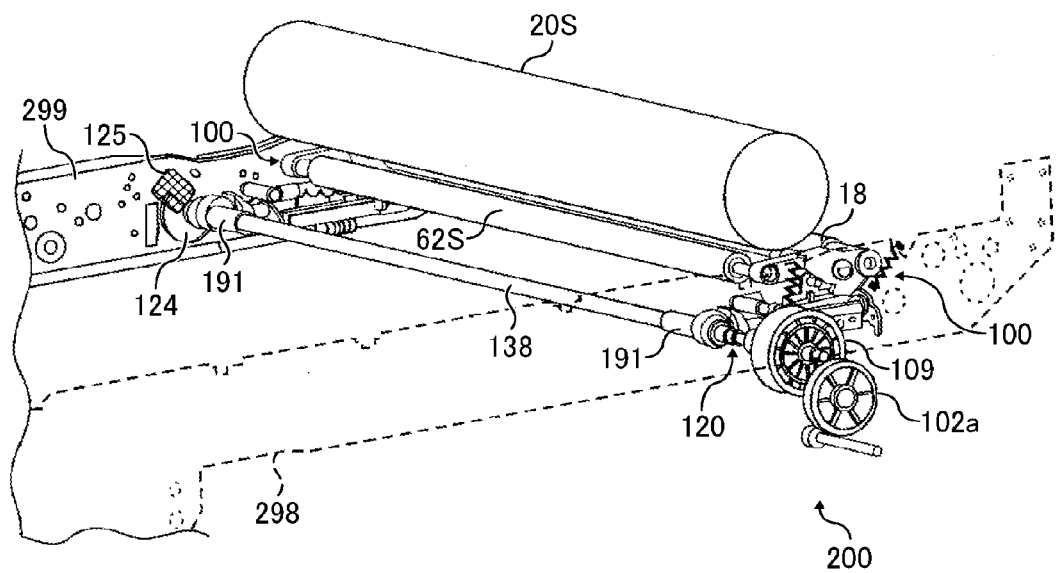
FIG. 2 is a perspective view illustrating a special color photoconductor and roller adjusting devices.

FIG. 2 is a perspective view illustrating the special color photoconductor 20S and the roller adjusting devices 100 according to an example of this disclosure.

As illustrated in FIG. 2, the roller adjusting devices 100 that bring the special color primary transfer roller 62S into contact or separation are respectively provided to a front plate 299 and a rear plate 298 of the intermediate transfer device 60. The rear plate 298 is indicated by a chain line in the figure. The roller adjusting devices 100 bring the driven roller 18 (see FIG. 1) into contact and separation, together with the special color primary transfer roller 62S. The driven roller 18 is placed upstream of the special color primary transfer roller 62S in a moving direction of the intermediate transfer belt 11. The roller adjusting devices 100 are driven by an adjustment drive device 200 to bring the special color primary transfer roller 62S and the driven roller 18 into contact and separation.

The adjustment drive device 200 functions as a driving device and includes a driven shaft 138 that is rotatably supported by the front plate 299 and the rear plate 298 via bearings. Cam members 191 are mounted in the vicinities of both ends of the driven shaft 138. A driving force of an adjustment motor 101 (see FIG. 15) that functions as a drive source provided in the rear of the image forming apparatus 1 is transmitted to the driven shaft 138 via an idler gear 102, a drive gear 109, and a coupling 120 to drive the driven shaft 138 for rotation.

A fan shaped feeler 124 is provided to a front end of the driven shaft 138. The feeler 124 is mounted to move between a light emitting device and a light receiving device of a transmissive optical sensor 125 provided to the front plate 299. When the feeler 124 is located between the light emitting device and the light receiving device of the transmissive optical sensor 125, the feeler 124 blocks the light of the light emitting device. When the light receiving device does not receive the light from the light emitting device, the output is turned off. By contrast, when the driven shaft 138 rotates and the feeler 124 is not located between the light emitting device and the light receiving device of the transmissive optical sensor 125, the light receiving device receives the light of the light emitting device, the output is turned on. In the present example, the switching of the output of the transmissive optical sensor 125 from ON to OFF or from OFF to ON is detected. Accordingly, whether the special color primary transfer roller 62S is at the separated position or at the contact position is detected to control the adjustment motor 101 (see FIG. 15).

Figure 3:
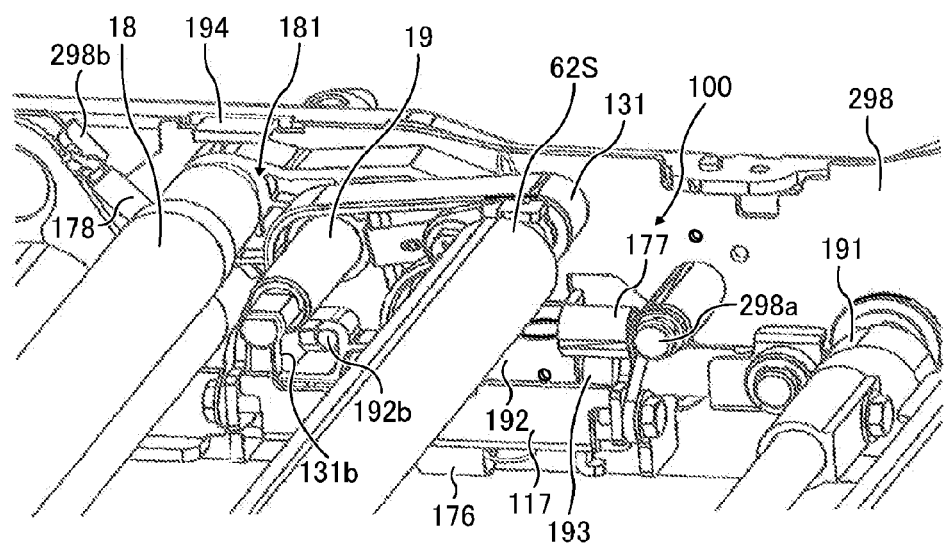
FIG. 3 is a perspective view of the vicinity of the roller adjusting device provided to a rear plate as viewed from the front and obliquely above.
Figure 4:
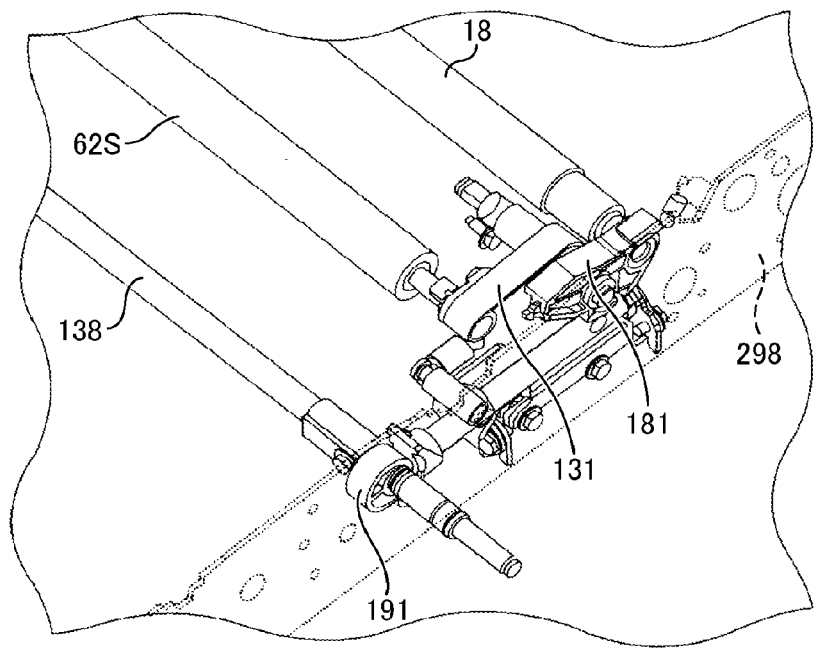
FIG. 4 is a perspective view of the vicinity of the roller adjusting device as viewed from the rear and obliquely above.
Figure 5:
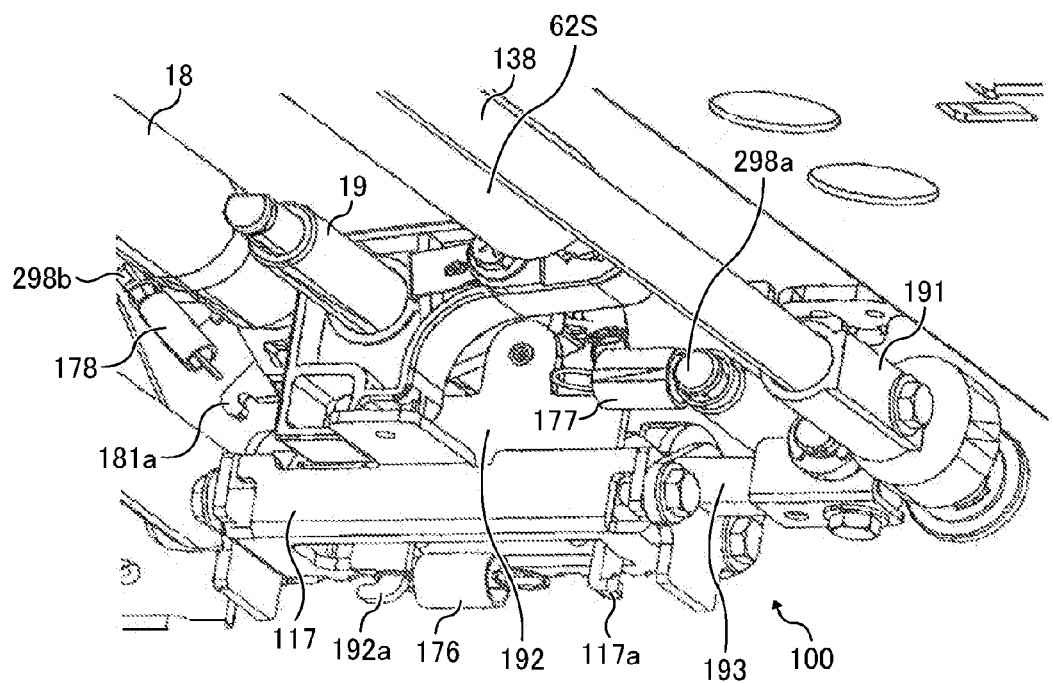
FIG. 5 is a perspective view of the vicinity of the roller adjusting device as viewed from the front and obliquely below.
Figure 6:
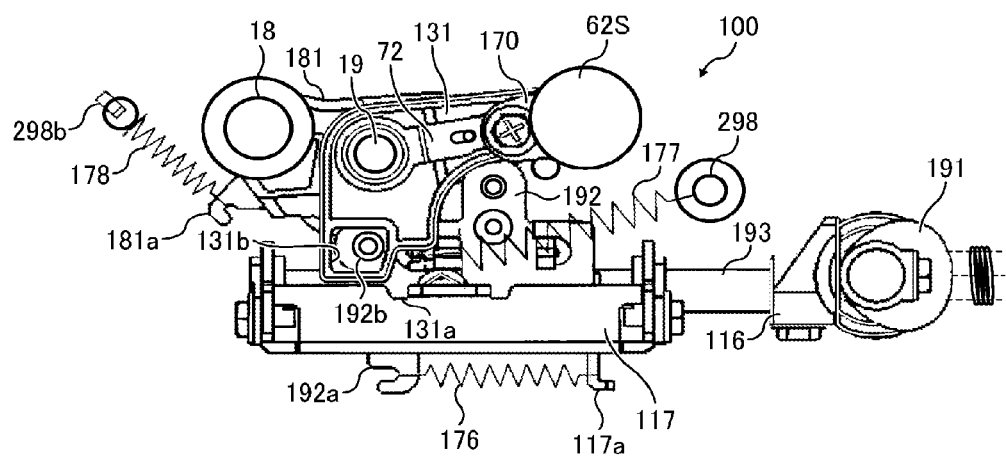
FIG. 6 is a diagram of the roller adjusting device as viewed from the front.
Figure 7:
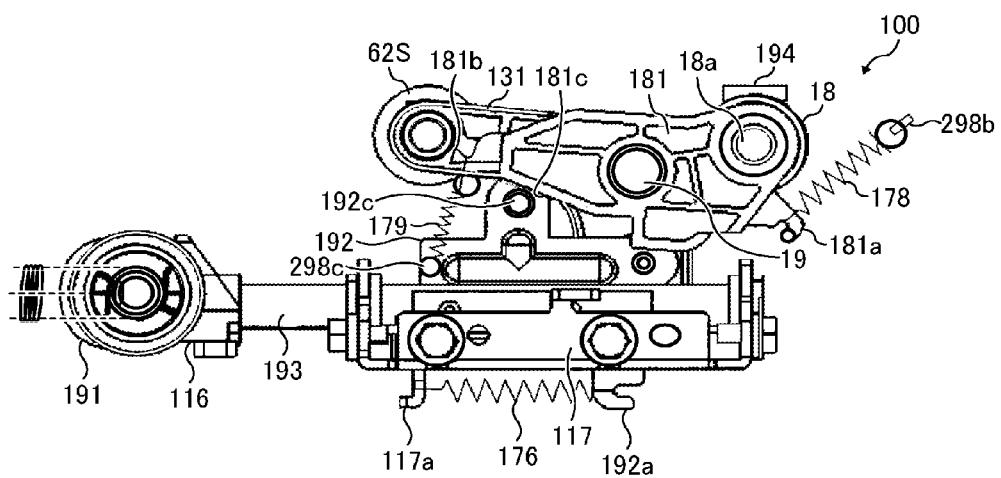
FIG. 7 is a diagram of the roller adjusting device as viewed from the rear.

FIG. 3 is a perspective view of the vicinity of the roller adjusting device 100 provided to the rear plate 298 as viewed from the front and obliquely above according to an example of this disclosure. FIG. 4 is a perspective view as viewed from the rear and obliquely above according to an example of this disclosure. FIG. 5 is a perspective view of the vicinity of the roller adjusting device 100 as viewed from the front and obliquely below according to an example of this disclosure. Moreover, FIG. 6 is a diagram of the roller adjusting device 100 as viewed from the front according to an example of this disclosure. FIG. 7 is a diagram of the roller adjusting device 100 as viewed from the rear according to an example of this disclosure. FIGS. 3 and 5 illustrate a state where respective one ends of tension springs 176, 177, and 178 functioning as biasing members for pulling the members of the roller adjusting device 100 are not held. Moreover, FIGS. 5 to 7 illustrate a state where the driven roller 18 and the special color primary transfer roller 62S are located at their contact positions.

The roller adjusting device 100 includes a transfer roller support bracket 131 that functions as a swing member that supports the special color primary transfer roller 62S rotatably, and a driven roller support bracket 181 that functions as a swing member that supports the driven roller 18 rotatably. The driven roller support bracket 181 is placed closer to the rear plate 298 than the transfer roller support bracket 131. The transfer roller support bracket 131 and the driven roller support bracket 181 are swingably supported by a swing shaft 19 that functions as a support shaft and is provided to the rear plate 298.

The transfer roller support bracket 131 and the driven roller support bracket 181 are formed of slidable resin with excellent slidability. Accordingly, the wear of the transfer roller support bracket 131 and the driven roller support bracket 181 caused by sliding over the swing shaft 19 is reduced. For example, ABS (acrylonitrile-butadiene-styrene copolymer), POM (polyacetal), PC (polycarbonate), and PA (polyamide) are preferable to be used as the slidable resin.

As illustrated in FIG. 6, a hook 131a that catches hold of one end of the first tension spring 177 is provided to a lower portion of the transfer roller support bracket 131. A first spring holding portion 298a provided to the rear plate 298 holds the other end of the first tension spring 177. Consequently, the transfer roller support bracket 131 is biased in a direction in which the first tension spring 177 is rotated around the swing shaft 19 in a counterclockwise direction in FIG. 6. As a result, the special color primary transfer roller 62S comes into contact with the special color photoconductor 20S via the intermediate transfer belt 11 with a given contact pressure.

Moreover, an opening 131b is formed in the lower portion of the transfer roller support bracket 131. A transfer roller adjustment pin 192b provided to a slide plate 192 is placed in the opening 131b.

The special color primary transfer roller 62S is rotatably supported by the transfer roller support bracket 131 via a conductive bearing 170. Moreover, the conductive bearing 170 is electrically connected to a connection terminal 72 electrically connected to a power supply for transfer. One end of the connection terminal 72 is fixed by a screw to the transfer roller support bracket 131 in such a manner as to contact the conductive bearing 170. The other end is rotatably supported by the swing shaft. With such a configuration, a transfer bias is applied to the special color primary transfer roller 62S via the connection terminal 72 and the conductive bearing 170.

As illustrated in FIG. 7, the driven roller 18 is rotatably supported by the driven roller support bracket 181 via a bearing 18a. A first hook 181a that catches hold of one end of the second tension spring 178 is provided at a right end in FIG. 7 of the driven roller support bracket 181. A second spring holding portion 298b provided to the rear plate 298 holds the other end of the second tension spring 178. Moreover, a second hook 181b that catches hold of one end of a third tension spring 179 is provided at a left end in FIG. 7 of the driven roller support bracket 181. A third spring holding portion 298c provided to the rear plate 298 holds the other end of the third tension spring 179. Consequently, the right side in FIG. 7 of the driven roller support bracket 181 is pulled upward in FIG. 7 by the second tension spring 178. The left side in FIG. 7 is pulled downward by the third tension spring 179. As a result, the driven roller support bracket 181 is biased by the second tension spring 178 and the third tension spring 179 in a direction in which the driven roller support bracket 181 rotates around the swing shaft 19 in a counterclockwise direction in FIG. 7. As previously illustrated in FIG. 3, the rear plate 298 is provided with a bent portion 194 for positioning the driven roller 18 that is bent inward. The driven roller support bracket 181 biased by the second tension spring 178 and the third tension spring 179 contacts the bent portion 194 for positioning the driven roller 18. Consequently, the driven roller 18 is located at a predetermined contact position, and contacts the intermediate transfer belt 11 with a given pressure.

Moreover, the roller adjusting device 100 is provided with a slide shaft 193. The slide plate 192 is mounted on the slide shaft 193. The slide shaft 193 is slidably held in parallel to the rear plate 298 by a slide shaft holder 117 that is fixed to the rear plate 298. A cam contact member 116 is provided at an end on the cam member 191 side of the slide shaft 193. In the present example, the cam contact member 116, the slide plate 192, and the slide shaft 193 form a slide assembly.

A first hook 192a that catches hold of one end of the fourth tension spring 176 is provided to a lower portion of the slide plate 192. A hook 117a provided to the slide shaft holder 117 is holding the other end of the fourth tension spring 176. Consequently, the slide plate 192 and the slide shaft 193 are biased by the fourth tension spring 176 toward the cam member 191. The cam contact member 116 comes into contact with the cam member 191 with a predetermined pressure.

As illustrated in FIG. 7, a driven roller adjustment pin 192c is fixed by caulking to a surface, which is opposed to the rear plate 298, of the slide plate 192. The driven roller adjustment pin 192c is fixed by caulking to the slide plate 192 so as to be opposed to an undersurface 181c leftward in FIG. 7 of the swing fulcrum of the driven roller support bracket 181. Moreover, as illustrated in FIGS. 3 and 6, the transfer roller adjustment pin 192b is fixed by caulking to a surface, which is opposite to the surface opposed to the rear plate 298, of the slide plate 192 so as to be located in the opening 131b of the transfer roller support bracket 131.

Figure 8:
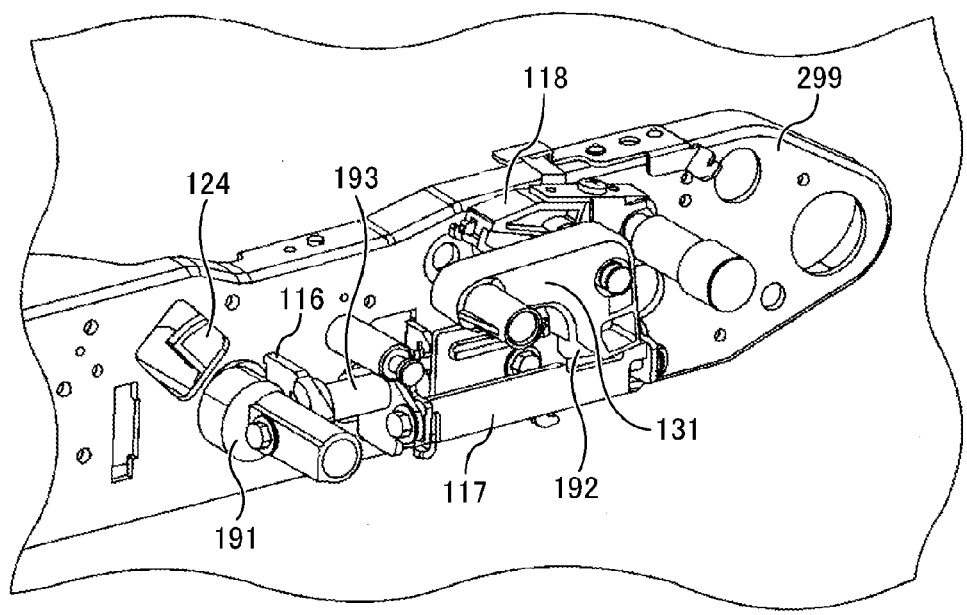
FIG. 8 is a perspective view illustrating the vicinity of the roller adjusting device provided to a front plate.

FIG. 8 is a perspective view illustrating the vicinity of the roller adjusting device 100 provided to the front plate 299 according to an example of this disclosure.

As illustrated in FIG. 8, the roller adjusting device 100 provided to the front plate 299 has the identical configuration to the above-described roller adjusting device 100 provided to the rear plate 298. In other words, the transfer roller support bracket 131 that rotatably supports the special color primary transfer roller 62S and the driven roller support bracket 181 that rotatably supports the driven roller 18 are swingably supported by the swing shaft of the front plate 299. Moreover, as in the roller adjusting device 100 provided to the rear plate, the slide shaft 193 is slidably supported by the slide shaft holder 117. One end of the slide shaft 193 is provided with the cam contact member 116. Moreover, the slide plate 192 is fixed to the slide shaft 193. The driven roller adjustment pin and the transfer roller adjustment pin are fixed by caulking to the slide plate 192 at the same positions as those of the roller adjusting device 100 provided to the rear plate 298.

Next, a description is given of the contact and separation of the driven roller 18 and the special color primary transfer roller 62S by the roller adjusting devices 100. As described above, the roller adjusting device 100 provided to the front plate 299 and the roller adjusting device 100 provided to the rear plate 298 have the same configuration. In the following section, a description is given using the roller adjusting device 100 of the rear plate 298.

Figure 9:
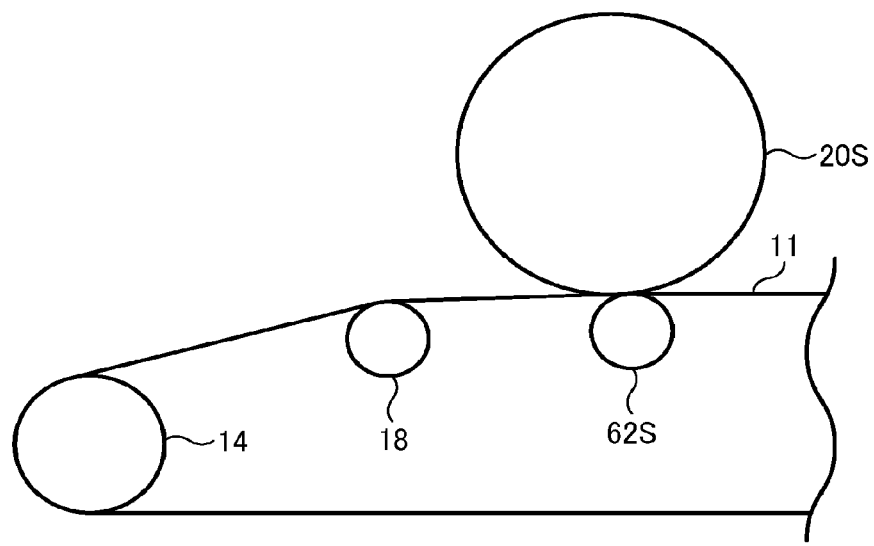
FIG. 9 is a schematic view of a configuration illustrating the vicinity of the special color photoconductor of when a driven roller and a special color primary transfer roller are at contact positions.
Figure 10:
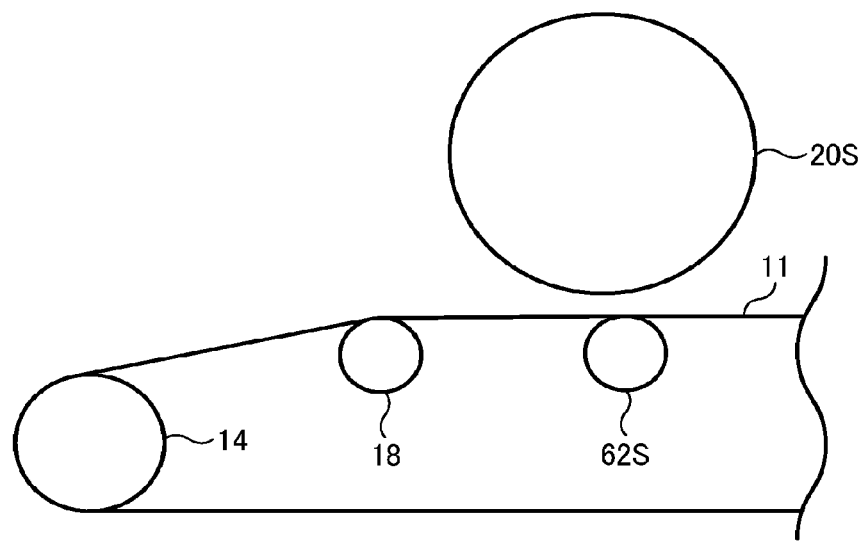
FIG. 10 is a schematic view of a configuration illustrating the vicinity of the special color photoconductor of when the driven roller and the special color primary transfer roller are at separated positions.

FIG. 9 is a schematic view illustrating a configuration in the vicinity of the special color photoconductor 20S of when the driven roller 18 and the special color primary transfer roller 62S are at their contact positions according to an example of this disclosure. FIG. 10 is a schematic view illustrating a configuration in the vicinity of the special color photoconductor 20S of when the driven roller 18 and the special color primary transfer roller 62S are at their separated positions.

Figure 11:
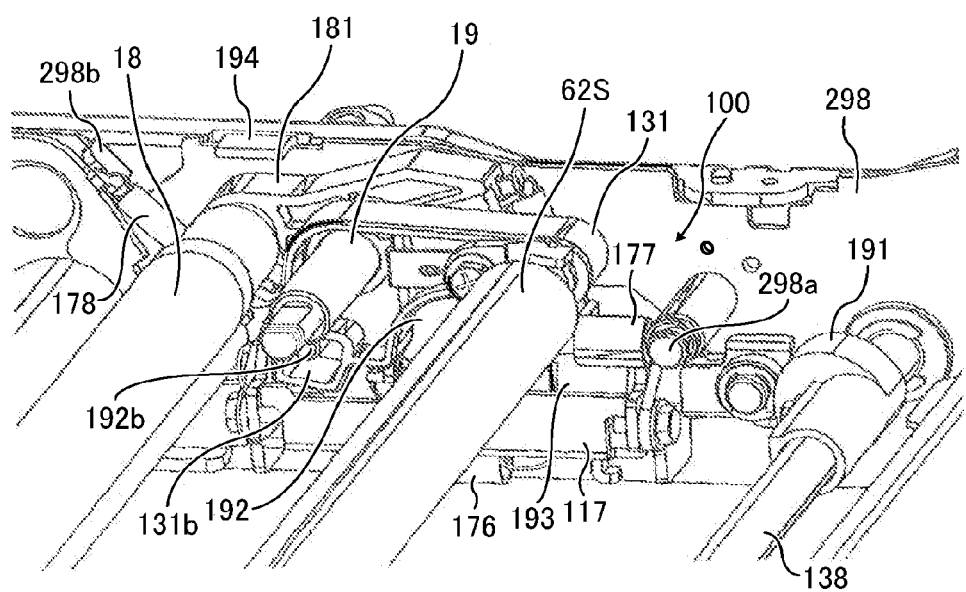
FIG. 11 is a perspective view of the vicinity of the roller adjusting device of when the driven roller and the special color primary transfer roller are at the separated positions as viewed from above.
Figure 12:
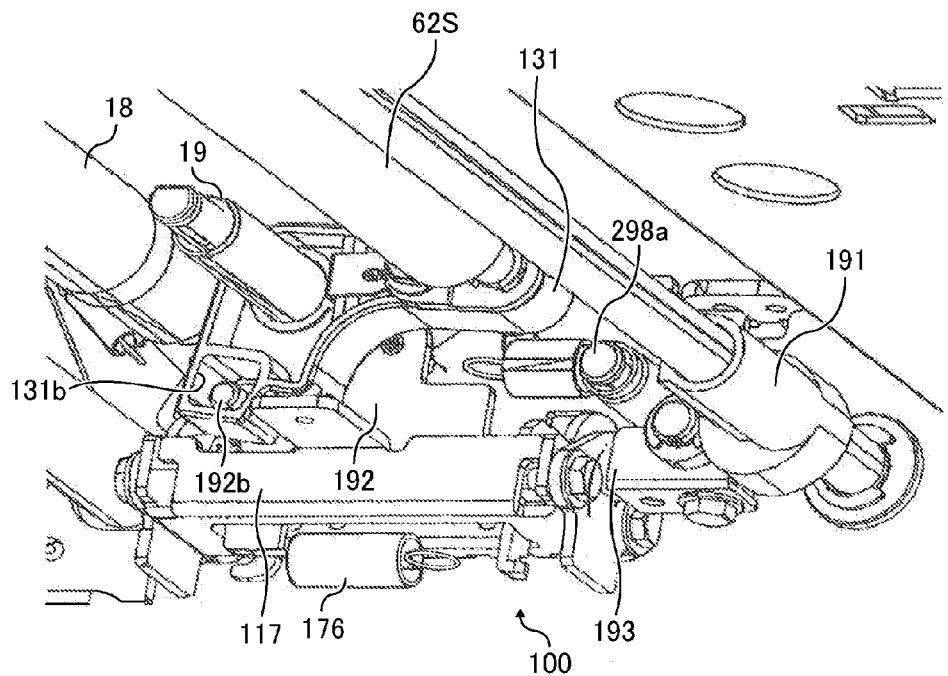
FIG. 12 is a perspective view of the vicinity of the roller adjusting device of when the driven roller and the special color primary transfer roller are at the separated positions as viewed from below.
Figure 13:
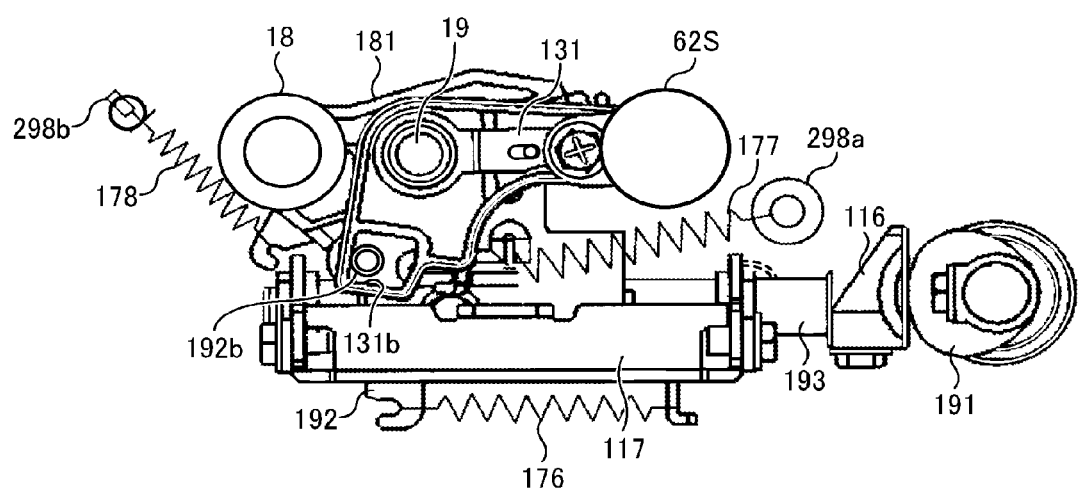
FIG. 13 is a diagram of the roller adjusting device of when the driven roller and the special color primary transfer roller are at the separated positions as viewed from the front.
Figure 14:
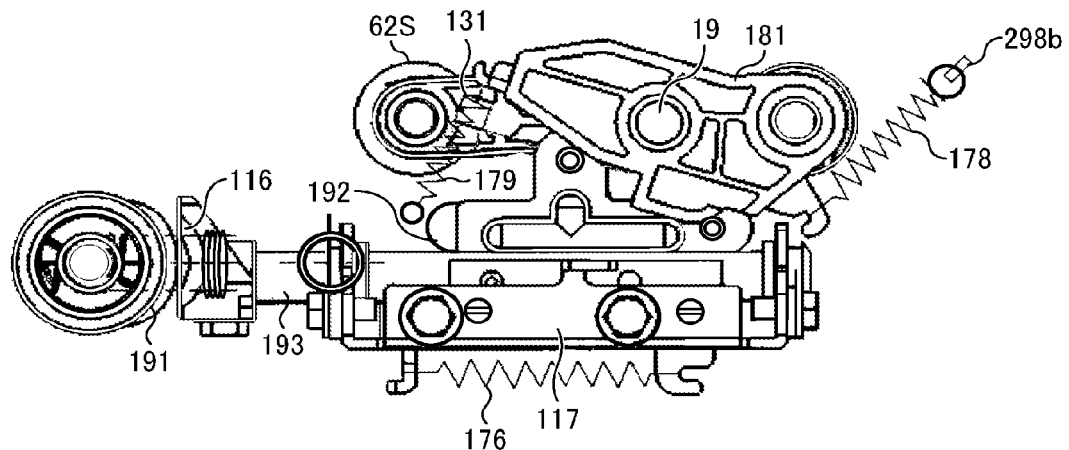
FIG. 14 is a diagram of the roller adjusting device of when the driven roller and the special color primary transfer roller are at the separated positions as viewed from the rear.

Moreover, FIG. 11 is a perspective view illustrating an area in the vicinity of the roller adjusting device 100 of when the driven roller 18 and the special color primary transfer roller 62S are at their separated positions as viewed from above. FIG. 12 is a perspective view illustrating an area in the vicinity of the roller adjusting device 100 of when the driven roller 18 and the special color primary transfer roller 62S are at their separated positions as viewed from below. Moreover, FIG. 13 is a diagram illustrating the roller adjusting device 100 of when the driven roller 18 and the special color primary transfer roller 62S are at their separated positions as viewed from the front. FIG. 14 is a diagram illustrating the roller adjusting device 100 of when the driven roller 18 and the special color primary transfer roller 62S are at their separated positions as viewed from the rear.

When the image forming mode is any one of the "special image forming mode" or the "full color image and special image forming mode", the roller adjusting device 100 locates the driven roller 18 and the special color primary transfer roller 62S at their contact positions as illustrated in FIG. 9. At this time, the roller adjusting device 100 is in the state previously illustrated in FIGS. 3 through 7. In other words, as previously illustrated in FIG. 6, the bottom dead center of the cam member 191 is in contact with the cam contact member 116. At this time, the transfer roller adjustment pin 192b of the slide plate 192 is away from an inner circumferential surface of the opening 131b. At this time, the transfer roller support bracket 131 is biased by the first tension spring 177 in the direction in which the transfer roller support bracket 131 rotates about the swing shaft 19 in the counterclockwise direction in FIG. 6. The special color primary transfer roller 62S comes into contact with the special color photoconductor 20S via the intermediate transfer belt 11 with a given pressure.

Moreover, when the image forming mode is any one of the "special image forming mode" or the "full color image and the special image forming mode", the driven roller adjustment pin 192c of the slide plate 192 is away from the undersurface 181c of the driven roller support bracket 181, as previously illustrated in FIG. 7. At this time, the driven roller support bracket 181 is biased by the second tension spring 178 and the third tension spring 179 in the direction in which the driven roller support bracket 181 rotates about the swing shaft 19 in the counterclockwise direction in FIG. 7. The driven roller support bracket 181 contacts the bent portion 194 for positioning the driven roller 18. Consequently, the driven roller 18 is positioned at the given contact position.

The driven roller 18 forms an entrance nip angle and a nip amount of a special color primary transfer nip formed between the special color photoconductor 20S and the intermediate transfer belt 11. The intermediate transfer belt 11 forms a sharp angle with respect to the special color primary transfer nip and have a smaller amount of nip without the driven roller 18. Therefore, an abnormal image is generated. Moreover, the driven roller 18 is separated from the special color photoconductor 20S as in the special color primary transfer roller 62S. Accordingly, the intermediate transfer belt 11 can be separated from the special color photoconductor 20S. Moreover, a driven roller that forms the exit nip angle and a nip amount of the special color primary transfer nip may be placed downstream of the special color primary transfer roller 62S in the moving direction of the intermediate transfer belt 11.

When any one of the "special image forming mode" and the "full color image and the special image forming mode" is switched to the "full color image forming mode", the "monochromatic image forming mode", or the "lubricant application mode", in any of which no image information is performed with the special color image forming unit 10S, the roller adjusting device 100 moves the driven roller 18 and the special color primary transfer roller 62S from the contact positions to the separated positions previously illustrated in FIG. 10.

When the driven roller 18 and the special color primary transfer roller 62S are moved from the contact positions illustrated in FIG. 9 to the separated positions illustrated in FIG. 10, the adjustment drive device 200 described below drives to rotate the cam member 191. When rotated, the cam member 191 presses in the cam contact member 116 against the biasing force of the fourth tension spring 176. The slide shaft 193 and the slide plate 192 mounted on the slide shaft 193 are then slid in a direction to separate away from the cam member 191. The transfer roller adjustment pin 192b of the slide plate 192 comes into contact with the inner circumferential surface of the opening 131b of the transfer roller support bracket 131. Moreover, the driven roller adjustment pin 192c of the slide plate 192 comes into contact with the undersurface 181c of the driven roller support bracket 181.

The slide shaft 193 and the slide plate 192 are further slid by the cam member 191 from the above-described state in the direction separating away from the cam member 191, the transfer roller adjustment pin 192b presses in the inner circumferential surface of the opening 131b of the transfer roller support bracket 131 in the direction separating away from the cam member 191. The transfer roller support bracket 131 then rotates about the swing shaft 19 in the clockwise direction in FIG. 5 against the biasing force of the first tension spring 177. Consequently, the special color primary transfer roller 62S moves from the contact position to the separated position.

As illustrated in FIG. 7, the undersurface 181c of the driven roller support bracket 181 is an inclined face that is inclined downward toward the direction separating away from the cam member 191. Hence, after having contacted the undersurface 181c of the driven roller support bracket 181, the cam member 191 slides the slide shaft 193 and the slide plate 192 in the direction separating away from the cam member 191, and then the driven roller adjustment pin 192c presses the undersurface 181c upward. As a result, the driven roller support bracket 181 rotates in a clockwise direction in FIG. 7 against the biasing forces of the second tension spring 178 and the third tension spring 179. The driven roller 18 moves from the contact position to the separated position.

As illustrated in FIGS. 11 through 14, when the top dead center of the cam member 191 comes into contact with the cam contact member 116, the drive of the cam member 191 stops, and the transfer roller support bracket 131 and the driven roller support bracket 181 take a separation attitude illustrated in FIGS. 11 through 14. Consequently, the special color primary transfer roller 62S and the driven roller 18 are located at the separated positions illustrated in FIG. 8. The intermediate transfer belt 11 is separated from the special color photoconductor 20S.

The drive of the cam member 191 is controlled based on the detection result of the feeler 124 of the transmissive optical sensor 125 previously illustrated in FIG. 2 by grasping the rotation state of the cam member 191.

Next, a description is given of the adjustment drive device 200 that drives to rotate the cam member 191, with reference to FIGS. 15 through 19.

Figure 15:
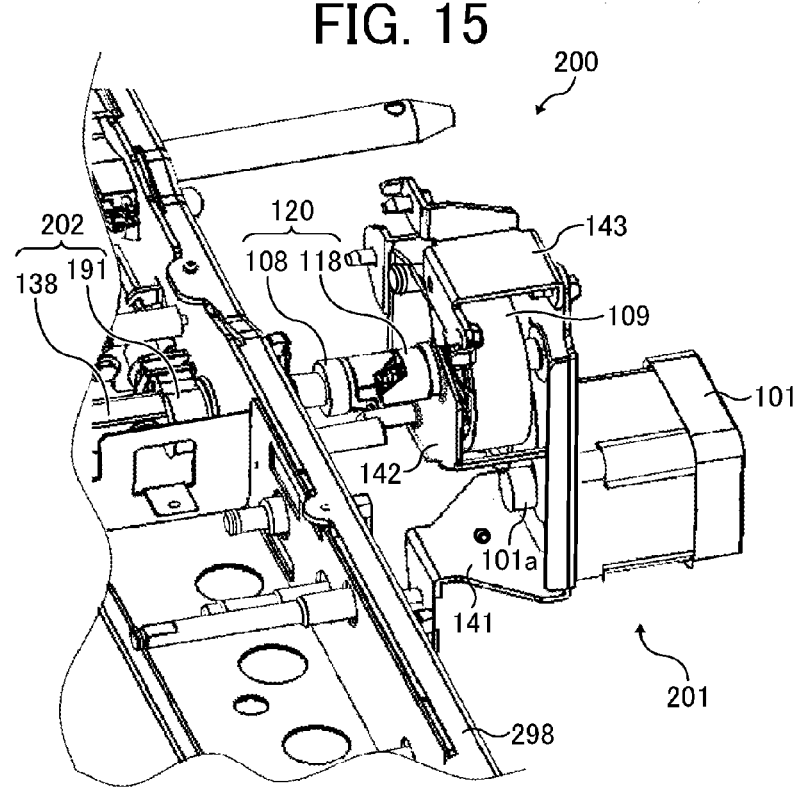
FIG. 15 is a perspective view of an adjustment drive device.
Figure 16:
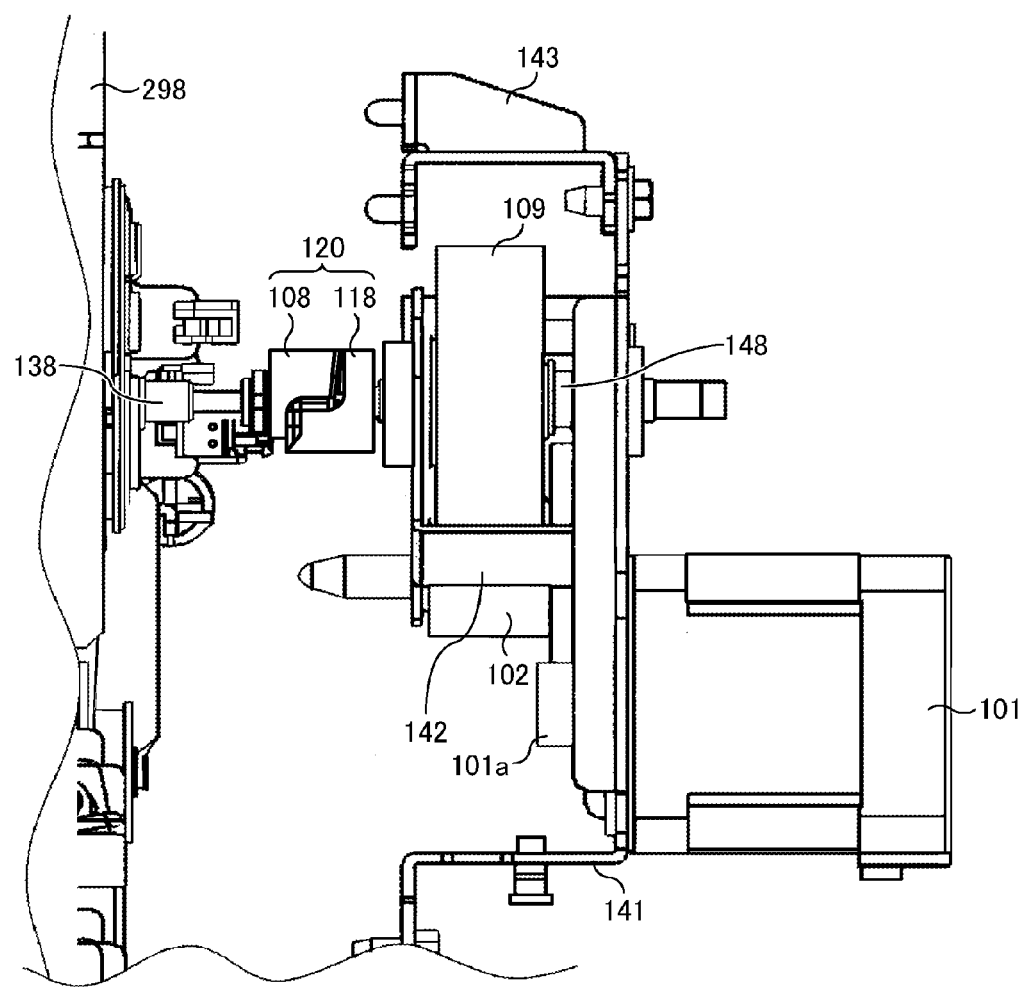
FIG. 16 is a side view of the adjustment drive device.
Figure 17:
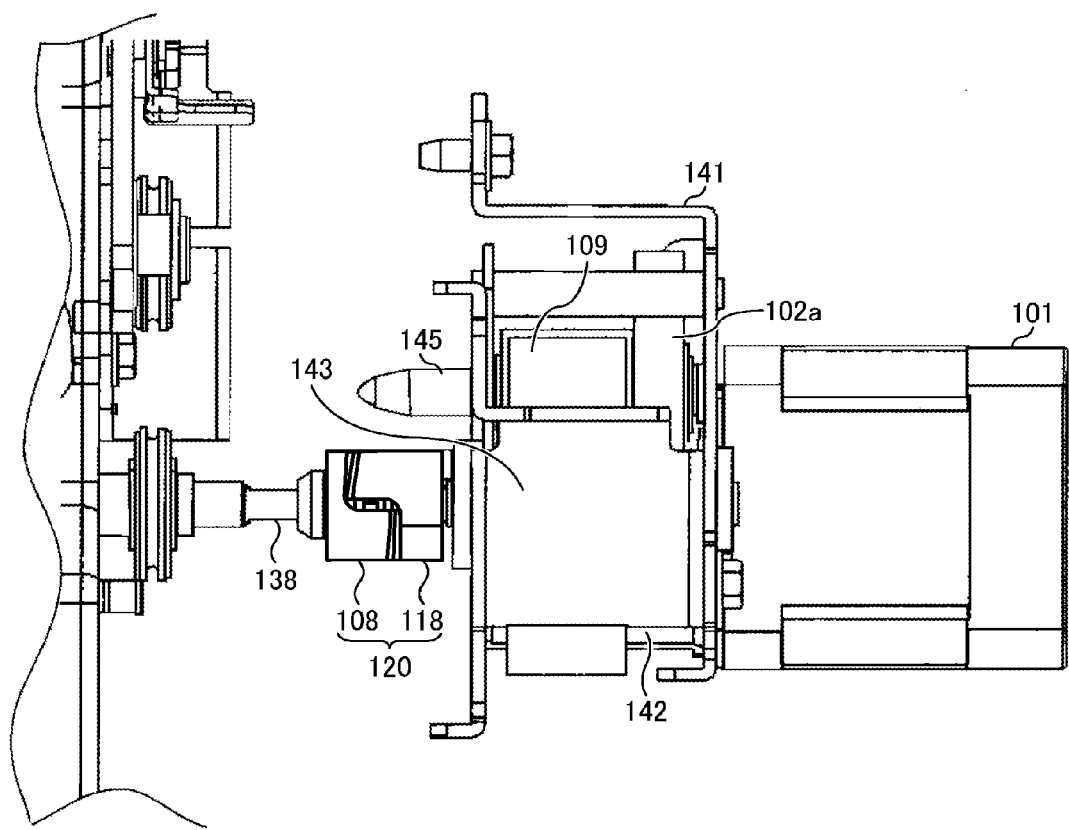
FIG. 17 is a plan view of the adjustment drive device.
Figure 18:
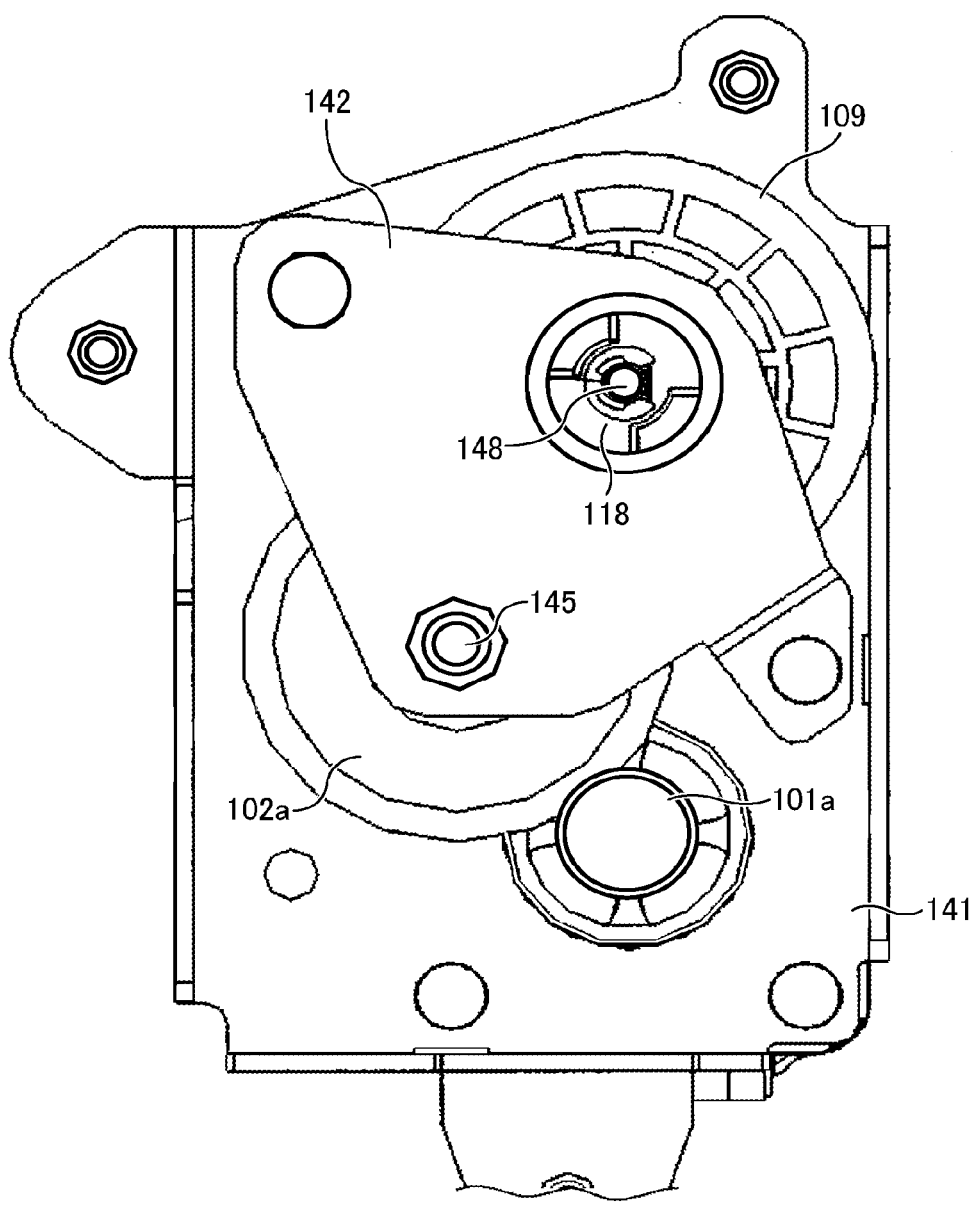
FIG. 18 is a front view of a drive unit of the adjustment drive device.
Figure 19:
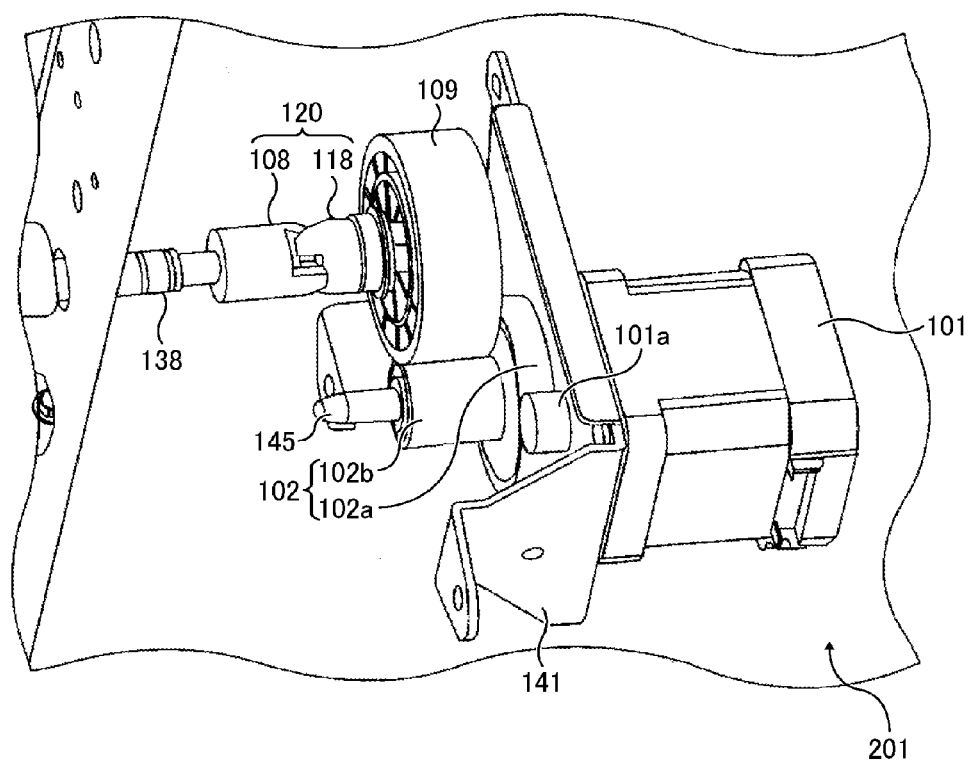
FIG. 19 is a perspective view illustrating a gear train of the drive unit.

FIG. 15 is a perspective view illustrating the adjustment drive device 200. FIG. 16 is a side view illustrating the adjustment drive device 200. FIG. 17 is a plan view illustrating the adjustment drive device 200. Moreover, FIG. 18 is a front view illustrating a drive unit 201 of the adjustment drive device 200. FIG. 19 is a perspective view illustrating a gear train of the drive unit 201.

The adjustment drive device 200 includes the drive unit 201 with the adjustment motor 101 and the like, and a driven unit 202 with the cam member 191, the driven shaft 138, and the like, which are drive target rotators.

The drive unit 201 includes a motor bracket 141 on which the adjustment motor 101 that also functions as a stepping motor is mounted. The motor bracket 141 is mounted on a frame of the apparatus body 9. Moreover, the drive unit 201 includes a drive faceplate 142 opposed to the motor bracket 141 with a given clearance. The drive faceplate 142 is mounted on the motor bracket 141 via a coupling 143.

The drive unit 201 includes an idler shaft 145 and a drive shaft 148.

The idler shaft 145 (see FIG. 19) rotatably supports the idler gear 102 having a first gear 102a and a second gear 102b. The idler shaft 145 is supported by the motor bracket 141 and the drive faceplate 142.

The drive shaft 148 (see FIG. 16) functions as a drive output shaft to which the drive gear 109 and a drive coupling 118 are fixed. The drive shaft 148 is rotatably supported by the motor bracket 141 and the drive faceplate 142.

As illustrated in FIG. 19, a motor gear 101a that is provided at an end of a motor shaft of the adjustment motor 101 is engaged with the first gear 102a of the idler gear 102. Moreover, the second gear 102b of the idler gear 102 is engaged with the drive gear 109. Consequently, the driving force of the adjustment motor 101 is transmitted to the drive shaft 148 via the motor gear 101a, the idler gear 102, and the drive gear 109. The driving force is then transmitted to the driven shaft 138 via the coupling 120 to drive the cam member 191 of the driven shaft 138 for rotation.

In the present example, a stepping motor is used as the adjustment motor 101. The use of the stepping motor can grasp the rotation amount of the cam member based on the number of pulse signals input to the stepping motor. Consequently, the rotation of the cam member 191 can be stopped at timings when the top and bottom dead centers of the cam member 191 come into contact with the cam contact member 116.

Next, a description is given of the coupling 120 that couples the drive shaft 148 to the driven shaft 138, with reference to FIGS. 20 through 26.

Figure 20:
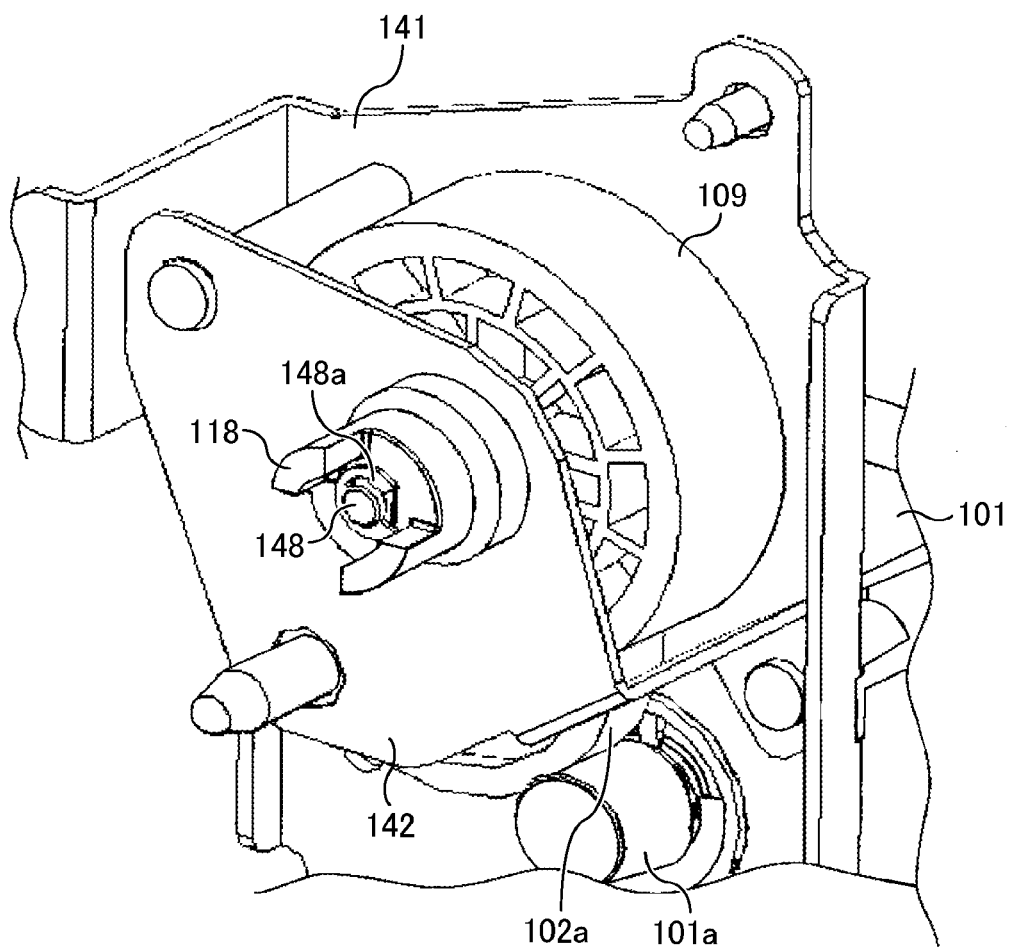
FIG. 20 is a perspective view of the vicinity of a drive coupling.

FIG. 20 is a perspective view of the vicinity of the drive coupling 118.

As illustrated in FIG. 20, a far end portion of the drive shaft 148 has a substantially oval shape (a substantially elliptical shape) with two flat portions cut away straight and spaced apart by 180 degrees in the rotation direction. The drive coupling 118 is fitted with the substantially oval shape portion. Moreover, an E ring 148a is mounted on a portion, where the drive coupling 118 penetrates, of the drive shaft 148 in order to prevent the drive coupling 118 from coming out of the drive shaft 148.

Figure 21:
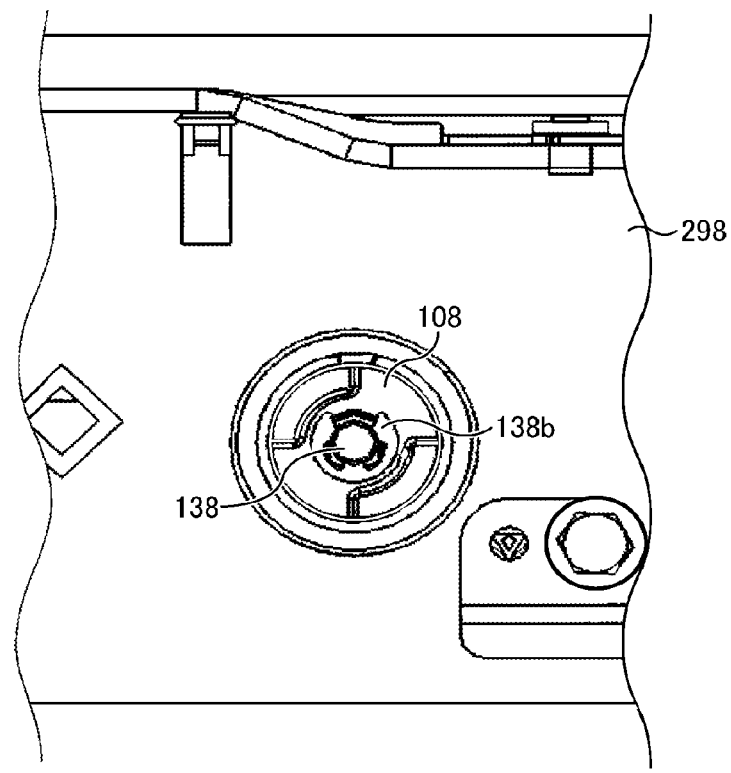
FIG. 21 is a front view of the vicinity of a driven coupling.
Figure 22:
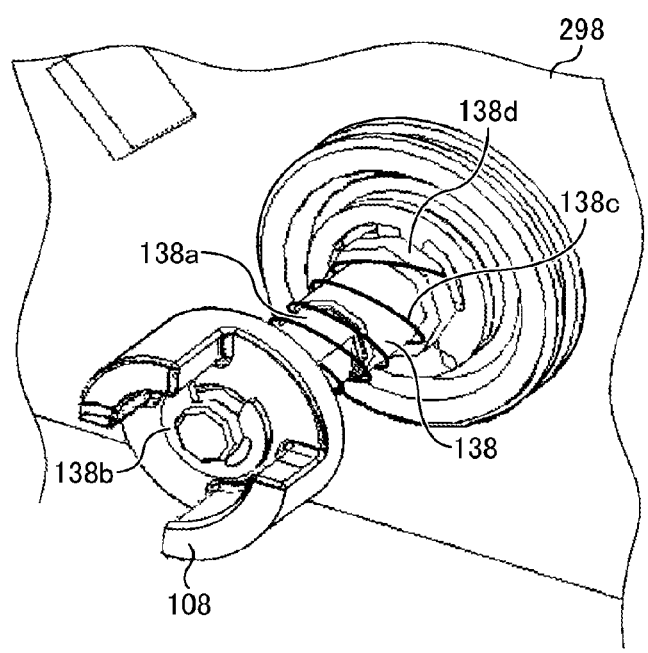
FIG. 22 is a perspective view of the vicinity of the driven coupling.

FIG. 21 is a front view illustrating the vicinity of a driven coupling 108 according to an example of this disclosure. FIG. 22 is a perspective view illustrating the vicinity of the driven coupling 108. As illustrated in FIGS. 21 and 22, a far end of the driven shaft 138 also has a substantially oval shape (a substantially elliptical shape) with two flat portions cut away straight and spaced apart by 180 degrees in the rotation direction as in the drive shaft 148. The driven coupling 108 is fitted with the substantially oval shape portion 138a. Moreover, an E ring 138b is mounted on a portion, where the driven coupling 108 penetrates, of the driven shaft 138 in order to prevent the driven coupling 108 from coming out of the driven shaft 138.

Moreover, the substantially oval shape portion 138a of the driven shaft 138 is greater than the length in the axial direction of a mount hole of the driven coupling 108. The driven coupling 108 is mounted on the driven shaft 138 so as to be movable in the axial direction within a given area. Moreover, a coil spring 138c is placed between the driven coupling 108 of the driven shaft 138 and a bearing 138d for rotatably supporting the driven shaft 138 on the rear plate 298. The driven coupling 108 is biased toward the drive shaft 148.

Figure 23A:
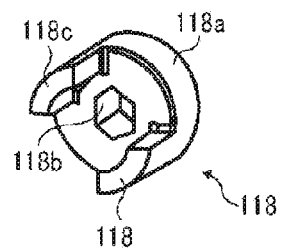
FIG. 23A is a perspective view of the drive coupling.
Figure 23B:
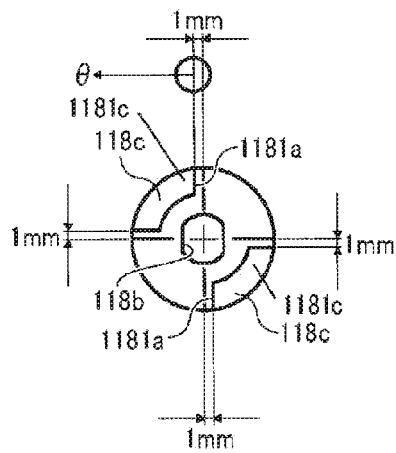
FIG. 23B is a front view of the drive coupling.
Figure 23C:
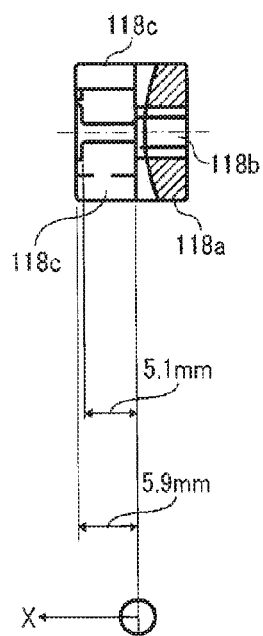
FIG. 23C is a cross-sectional view of the drive coupling.
Figure 23D:
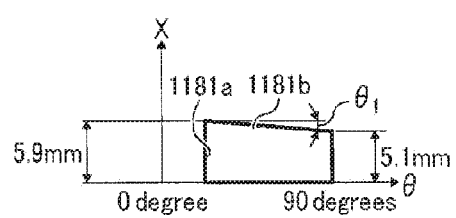
FIG. 23D is a detailed view of drive claws provided to the drive coupling.

FIGS. 23A through 23D are schematic views illustrating a configuration of the drive coupling 118. FIG. 23A is a perspective view of the drive coupling 118. FIG. 23B is a front view of the drive coupling 118. Moreover, FIG. 23C is a cross-sectional view of the drive coupling 118. FIG. 23D is a detailed view of drive claws 118c.

As illustrated in FIGS. 23A through 23D, the drive coupling 118 has a substantially ring shaped drive base 118a with a mount hole 118b in the rotation center. The mount hole 118b includes flat inner circumferential surfaces and arc shaped inner circumferential surfaces, and has a substantially oval shape (a substantially elliptical shape) in cross section where the flat inner circumferential surfaces are opposed to each other and the arc shaped inner circumferential surfaces are opposed to each other. Two drive claws 118c are provided on a face disposed facing the adjustment motor 101 of the drive base 118a and are disposed spaced apart by 180 degrees in the rotation direction. As illustrated in FIG. 23B, the drive claw 118c has a drive transmission face that functions as a drive transmission portion disposed in a direction perpendicular to the rotation direction, which is formed at a position deviating about 1 mm from a vertical reference line in FIG. 23B in a rotation direction θ. Moreover, the drive claw 118c extends in the rotation direction θ from the drive transmission face 1181a to a position about 1 mm before a horizontal reference line in FIG. 23B. Moreover, a far end face 1181b in a direction perpendicular to a rotation axis direction X of the drive claw 118c is an inclined face. The far end face 1181c functions as an opposing face that is opposed to the driven coupling 108. The height of the far end face 1181b from the drive base 118a gradually decreases toward a direction separating away from the drive transmission face 1181a in the rotation direction θ. Specifically, as illustrated in FIG. 23D, the height from the drive base 118a at an end on the drive transmission face 1181a side of the drive claw is about 5.9 mm. The height from the drive base 118a at an end opposite to the drive transmission face 1181a is about 5.1 mm. In other words, the far end face 1181b of the drive claw 118c is an inclined face inclined by an angle θ1 with respect to a drive claw formation face of the drive base 118a, as illustrated in FIG. 23D. The drive claw formation face is a virtual vertical plane normal to the rotation axis direction X.

Figure 24A:
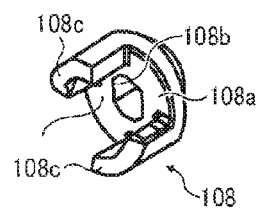
FIG. 24A is a perspective view of the driven coupling.
Figure 24B:
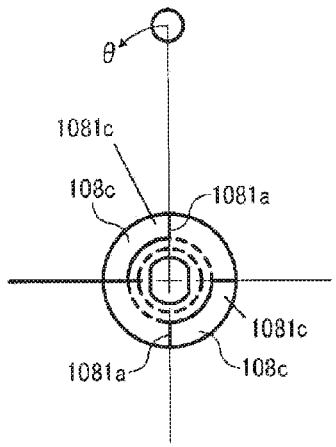
FIG. 24B is a front view of the driven coupling.
Figure 24C:
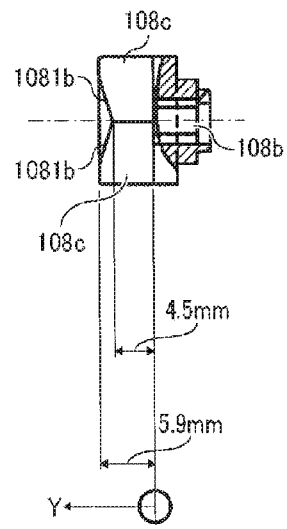
FIG. 24C is a cross-sectional view of the driven coupling.
Figure 24D:
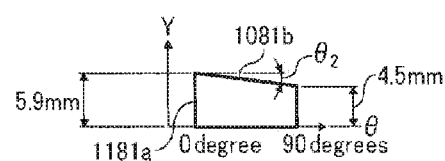
FIG. 24D is a detailed view of driven claws provided to the driven coupling.

FIGS. 24A through 24D are schematic views illustrating a configuration of the driven coupling 108. FIG. 24A is a perspective view of the driven coupling 108. FIG. 24B is a front view of the driven coupling 108. Moreover, FIG. 24C is a cross-sectional view of the driven coupling 108. FIG. 24D is a detailed view of the driven claws 108c.

As illustrated in FIGS. 24A through 24D, the driven coupling 108 includes a substantially ring shaped driven base 108a with a mount hole 108b in the rotation center. The mount hole 108b includes flat inner circumferential surfaces and arc shaped inner circumferential surfaces, and has a substantially oval shape (a substantially elliptical shape) in cross section where the flat inner circumferential surfaces are opposed to each other and the arc shaped inner circumferential surfaces are opposed to each other. Two driven claws 108c are provided on a face disposed facing the rear plate 298 of the driven base 108a are disposed spaced apart by 180 degrees in the rotation direction. As illustrated in FIG. 24B, the driven claw 108c extends in the rotation direction from a driven transmission face 1081a that functions as a driven transmission portion disposed in a direction perpendicular to the rotation direction to a 90-degree position in the rotation direction θ. Moreover, a far end face 1081b in a direction perpendicular to a rotation axis direction Y of the driven claw 108c is an inclined face where the height from the driven base 108a gradually decreases toward a direction separating away from the driven transmission face 1081a in the rotation direction θ. The far end face 1081c functions as an opposing face that is opposed to the drive coupling 118. Specifically, as illustrated in FIG. 24D, the height from the driven base 108a at an end on the driven transmission face 1081a side of the driven claw is about 5.9 mm. The height from the driven base 108a at an end opposite to the driven transmission face 1081a is about 4.5 mm. In other words, the far end face 1081b of the driven claw is an inclined face inclined by an angle θ2 with respect to a driven claw formation face of the driven base 108a, as illustrated in FIG. 24D. The driven claw formation face is a virtual vertical plane normal to the rotation axis direction Y.

Moreover, the inclined angle θ2 of the far end face 1081b of the driven claw is greater than the inclined angle θ1 of the far end face 1181b of the drive claw 118c (θ1<θ2).

Figure 25:
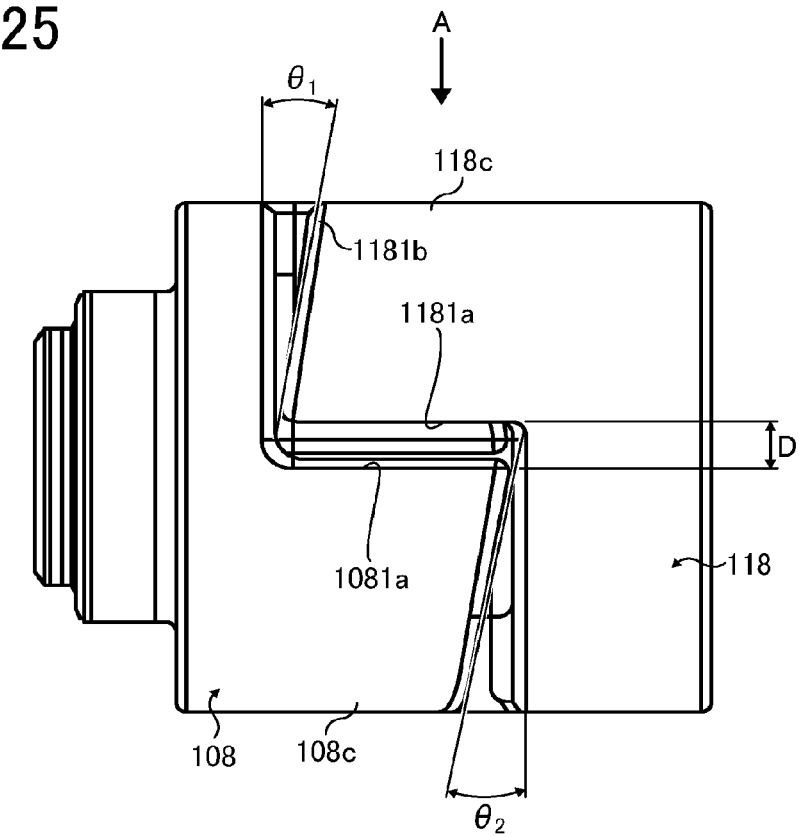
FIG. 25 is a diagram illustrating an engagement state between a drive transmission face of a drive claw and a driven transmission face of a driven claw of when the drive coupling is coupled to the driven coupling.
Figure 26:
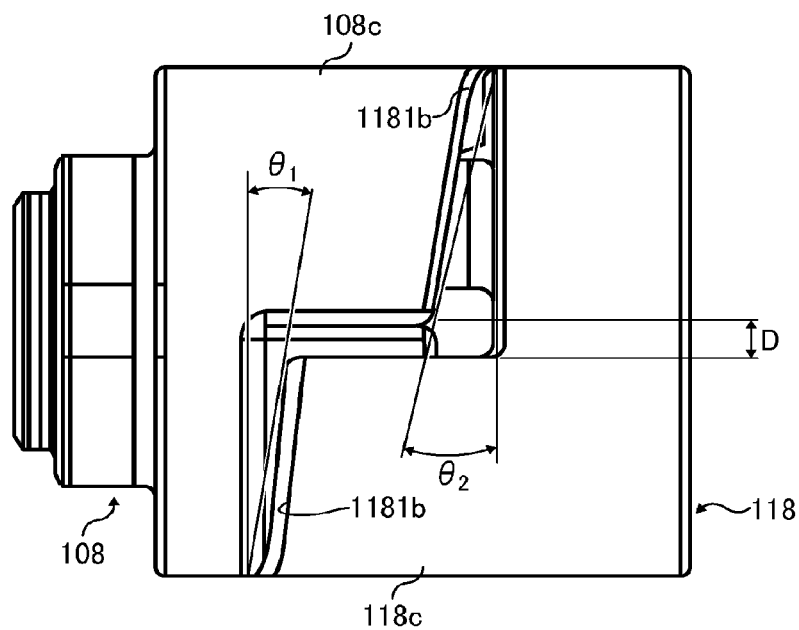
FIG. 26 is a diagram as viewed from direction A of FIG. 25.

FIG. 25 is a diagram illustrating an engagement state between the drive transmission face 1181a of the drive claw 118c and the driven transmission face 1081a of the driven claw 108c of when the drive coupling 118 is coupled to the driven coupling 108. FIG. 26 is a diagram as viewed from direction A of FIG. 25.

When the drive coupling 118 is coupled to the driven coupling 108 in a state where the driven claw 108c of the driven coupling 108 is 90 degrees out of phase with the drive claw 118c of the drive coupling 118, a gap D is created between the drive transmission face 1181a and the driven transmission face 1081a, as illustrated in FIG. 25. The gap D is about 1 mm. Moreover, at this time, as illustrated in FIG. 26, the gap D of about 1 mm is also created between the end of the drive claw 118c, which is opposite to the drive transmission face 1181a, and the end of the driven claw 108c, which is opposite to the driven transmission face 1081a. Thus, by creating a gap of about 1 mm between the drive claw 118c and the driven claw 108c, the coupling 120 can be shifted by about 1 mm in the axial direction between the drive shaft 148 and the driven shaft 138.

Moreover, when the adjustment motor 101 is driven, and the drive transmission face 1181a of the drive claw 118c comes into contact with the driven transmission face 1081a of the driven claw 108c to transmit the driving force from the drive coupling 118 to the driven coupling 108, a gap of 2 mm is created between the end of the drive claw 118c, which is opposite to the drive transmission face 1181a and the end of the driven claw 108c, which is opposite to the driven transmission face 1081a.

Figure 27A:
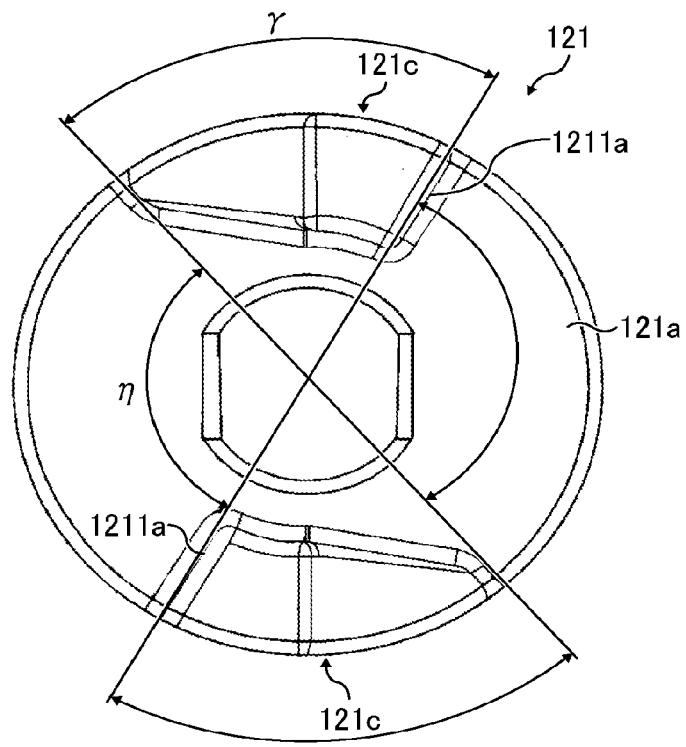
FIG. 27A is a front view illustrating an example of a known drive coupling.
Figure 27B:
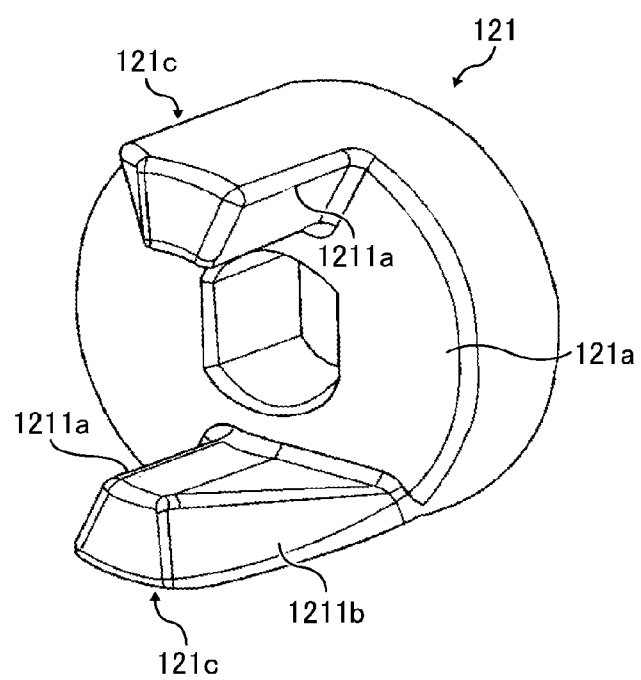
FIG. 27B is a perspective view illustrating the known drive coupling.

FIGS. 27A and 27B are diagrams illustrating an example of a known drive coupling 121. FIG. 27A is a front view of the known drive coupling 121. FIG. 27B is a perspective view of the known drive coupling 121.

As illustrated in FIGS. 27A and 27B, an area γ is an area to form a drive claw 121c of the known drive coupling 121. The drive claw formation area is much narrower than 90 degrees. A drive claw non-formation area η is sufficiently greater than 90 degrees. Moreover, a far end face 1211b of the drive claw 121c has a parallel face that is parallel to the drive claw formation face of a drive base 121a and an inclined face inclined with respect to the drive claw formation face.

Figure 28A:
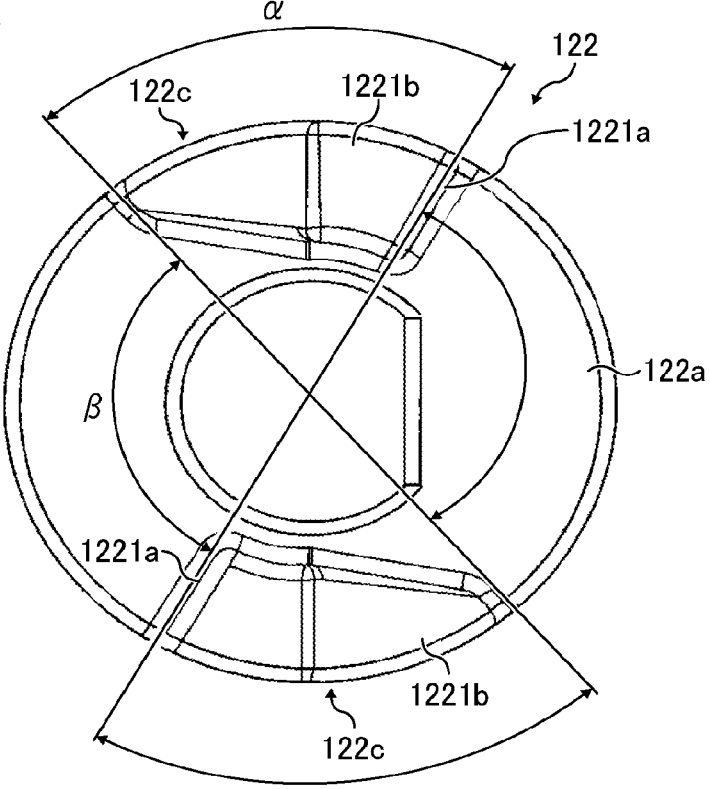
FIG. 28A is a front view illustrating an example of a known driven coupling.
Figure 28B:
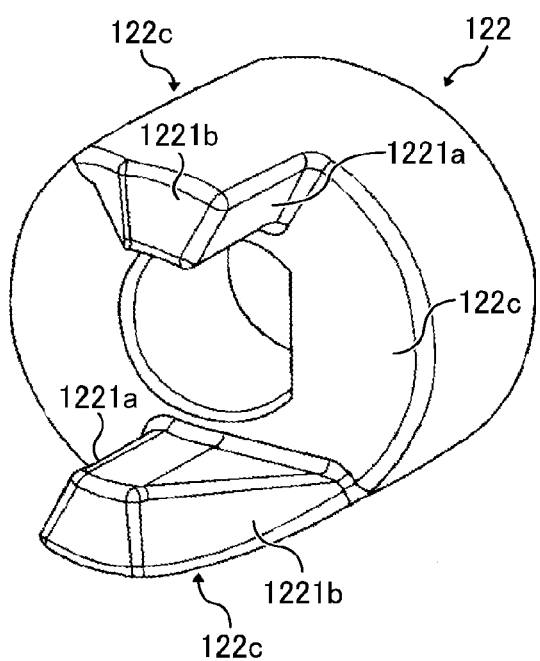
FIG. 28B is a perspective view illustrating the known driven coupling.

FIGS. 28A and 28B are diagrams illustrating an example of a known driven coupling 122. FIG. 28A is a front view of the known driven coupling 122. FIG. 28B is a perspective view of the known driven coupling 122.

As illustrated in FIG. 28A, a formation area α is an area of a driven claw 122c of the known driven coupling 122. A driven claw formation area is much narrower than 90 degrees. A driven claw non-formation area β is sufficiently greater than 90 degrees. Moreover, a far end face 1221b of the driven claw 122c has a parallel face that is parallel to the driven claw formation face of a driven base 122a and an inclined face inclined with respect to the driven claw formation face. The far end face 1221b has the same shape as the drive claw 121c. In other words, the inclination angle of the inclined face of the drive claw 121c is the same inclination angle of the inclined face of the driven claw 122c.

When the known drive coupling 121 is coupled to the known driven coupling 122 in a state in which the driven claw 122c of the known driven coupling 122 is 90 degrees out of phase with the drive claw 121c of the known drive coupling 121, a gap of about 10 mm is created between the drive claw 121c and the driven claw 122c. Hence, when the adjustment motor 101 is driven and the drive transmission face 1211a of the drive claw comes into contact with a driven transmission face 1221a of the driven claw 122c to transmit the driving force from the drive coupling 121 to the driven coupling 122, a gap of about 20 mm is created between the end of the drive claw 121c, which is opposite to the drive transmission face and the end of the driven claw 122c, which is opposite to the driven transmission face.

Figure 29:
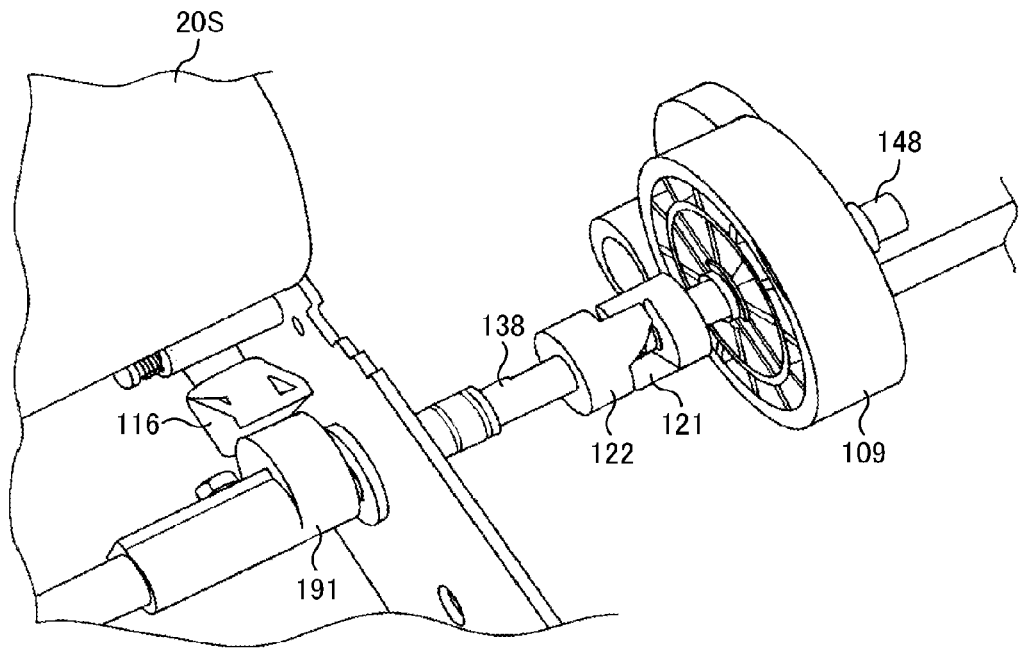
FIG. 29 is a diagram illustrating the state of drive transmission of the known coupling.
Figure 30:
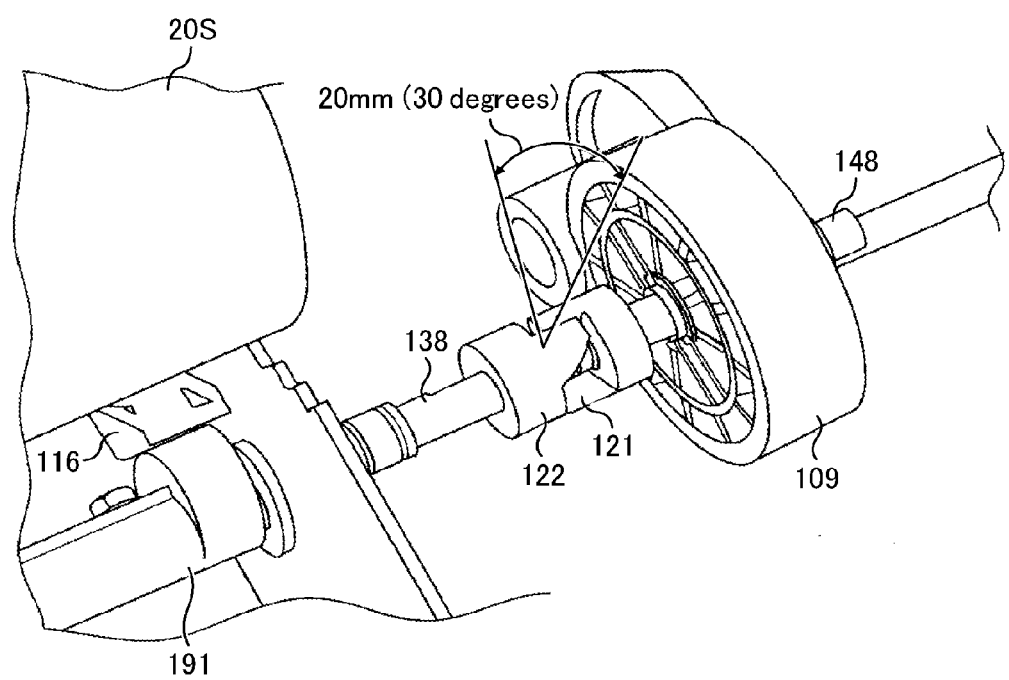
FIG. 30 is a diagram illustrating a state upon the occurrence of a failure in the known coupling.

Thus, there is an inconvenience that if the known coupling with a wide gap between the drive claw and the driven claw is used, when the drive coupling is coupled to the driven coupling, the adjustment motor that corresponds to the stepping motor goes out of synchronization. The causes of the step-out or loss of the synchronization of the adjustment motor 101 are described below. As previously illustrated in FIGS. 6 and 7, the cam contact member 116 is in contact with the cam member 191 with the biasing force of the fourth tension spring 176. As previously illustrated in FIG. 13, the cam member 191 is driven for rotation, starting from the condition where the top dead center of the cam member 191 is in contact with the cam contact member 116 (the special color primary transfer roller 62S and the driven roller 18 at the separated positions). As illustrated in FIG. 29, immediately after the start, the drive transmission face of the drive claw 121c of the drive coupling 121 contacts the driven transmission face of the driven claw 122c of the driven coupling 122 to transmit the driving force of the adjustment motor 101 from the drive coupling 121 to the driven coupling 122. Accordingly, the cam member 191 is driven for rotation. When the cam member 191 continues to rotate, the biasing force of the fourth tension spring 176 is added to the rotation direction of the cam member 191 via the cam contact member 116. The cam member 191 is then rotated not with the driving force of the adjustment motor 101 but with the biasing force of the fourth tension spring 176. As illustrated in FIG. 30, the end of the driven claw 122c, which is opposite to the driven transmission face, contacts the end of the drive claw 121c, which is opposite to the drive transmission face. In the known coupling, the gap between the drive claw 121c and the driven claw 122c is about 20 mm (an angle of about 30 degrees). When the cam member 191 rotates with the biasing force of the fourth tension spring 176, the adjustment goes out of synchronization.

The reason that the adjustment motor 101 goes out of synchronization when the cam member 191 rotates with the biasing force of the fourth tension spring 176 is not certain. However, the loss of synchronization of the adjustment motor 101 is considered to have occurred for the following causes. One cause is considered that, as a result of the rotation of the cam member 191 with the biasing force of the fourth tension spring 176, the driven transmission face of the driven coupling 122 was moved away from the drive transmission face. As a result, the load of the adjustment motor 101 disappears to enter a no-load state. In the known coupling, as described above, the drive claw 121c is as much as 20 mm away from the driven claw 122c upon drive transmission, and the state in which the adjustment motor 101 has no load lasts long. The long lasting no-load state caused the loss of synchronization of the adjustment motor 101.

Another cause is considered that the cam member 191 rotated with the biasing force of the fourth tension spring 176 to gather speed, and the driven coupling 122 coupled to the cam member 191 via the driven shaft 138 gathered speed. As the gap between the drive claw 121c and the driven claw 122c was increased, the acceleration was promoted, and the impact of the contact of the driven claw 122c with the drive claw 121c was increased. As a result, a change in the load of the adjustment motor 101 upon the contact of the driven claw 122c with the drive claw 121c was increased to cause the loss of synchronization of the adjustment motor 101.

The factors behind the ideas of both the above-described causes were caused by a wide gap of about 20 mm (an angle of about 30 degrees) between the drive claw 121c of the drive coupling 121 and the driven claw 122c of the driven coupling 122, as illustrated in FIG. 30.

To address the above-described inconveniences, in the present example, the formation area of the drive claw 118c and the formation area of the driven claw 108c are set to about 90 degrees. A gap (play) between the drive claw 118c and the driven claw 108c upon drive transmission is set to about 2 mm. Consequently, even if the cam member 191 rotates with the biasing force of the fourth tension spring 176, the driven claw 108c immediately contacts the drive claw 118c. Consequently, the time for rotating the adjustment motor 101 at no load can be reduced. Moreover, the driven claw 108c contacts the drive claw 118c before being sufficiently accelerated by the fourth tension spring 176. Accordingly, the impact force can be reduced. The change in the load of the adjustment motor 101 can be restrained. Thus, the gap between the drive claw 118c and the driven claw 108c upon drive transmission is reduced to eliminate the above-described inconveniences. Consequently, a loss of synchronization can be restrained in the adjustment motor 101.

The intermediate transfer device 60 can be pulled frontward with respect to the apparatus body 9. When the intermediate transfer device 60 is pulled frontward from the apparatus body 9, the driven coupling 108 is decoupled from the drive coupling 118. When the intermediate transfer device 60 is attached to the apparatus body 9, the driven coupling 108 is coupled to the drive coupling 118. In the present example, as described above, the gap between the drive claw 118c and the driven claw 108c is narrow. Therefore, if the driven claw 108c is misaligned from the position rotated by 90 degrees with respect to the drive claw 118c, the driven claw 108c contacts the drive claw 118c upon coupling. As a result, the intermediate transfer device 60 cannot be attached to the apparatus body 9.

In a comparative case in which a drive joint and a driven joint have the same shape, if a drive claw and a driven claw are located opposite to each other in the rotation direction when a drive target rotator is attached to an apparatus body of an image forming apparatus, a far end face of the drive claw and a far end face of the driven claw come into surface contact. If the driven joint presses in the drive joint by the action of attaching the drive target rotator in this state, a pressing force is also added to the rotation direction on the inclined far end face. However, since it is the surface contact, the friction force is strong. Accordingly, even if the pressing force is added to the rotation direction, the driven joint does not rotate easily relative to the drive joint. As a result, unless the drive target rotator is firmly pressed in the axial direction, the driven joint does not rotate relative to the drive joint, and the drive claws and the driven claws are not located at alternate positions. Consequently, the workability of the attachment of the drive target rotator is poor.

In order to address the inconvenience, as previously illustrated in FIG. 22, the driven coupling 108 of the present example is designed to be movable along the driven shaft 138 within the given area in the axial direction. Hence, even if the driven claws 108c contact the drive claws 118c and the drive coupling 118 is not coupled to the driven coupling 108, the driven coupling 108 moves toward the rear plate 298 against the biasing force of the coil spring 138c. Accordingly, the intermediate transfer device 60 can be attached to the apparatus body 9. When the adjustment motor 101 is driven to bring the special color primary transfer roller 62S and the driven roller 18 into contact or separation, the drive claws 118c are located between the driven claws 108c. The driven coupling 108 then moves toward the adjustment motor 101 with the biasing force of the coil spring 138c. The driven claws 108c can be fitted between the drive claws 118c. The driven coupling 108 can be then coupled to the drive coupling 118.

However, when the driven claws 108c are fitted between the drive claws 118c, impact is generated to vibrate the intermediate transfer device 60 and the like. During the image forming operation, the special color primary transfer roller 62S and the driven roller 18 can be brought into contact or separation. As a result, if the intermediate transfer device 60 and the like vibrate, an abnormal image such as banding may be created due to an influence on an image.

In the present example, the inclination angle θ1 of the far end face 1181b of the drive claw is made different from the inclination angle θ2 of the far end face 1081b of the driven claw 108c. Consequently, when the driven claw 108c contacts the drive claw 118c, the drive claw 118c comes into line contact with the driven claw 108c. Specifically, a far end (in the present example, a far edge of the driven transmission face 1081a) of a claw (i.e., the driven claw 108c in the present example) with a greater inclination angle of a far end face contacts a far end face of a claw (i.e., the drive claw 118c in the present example) with a smaller inclination angle of a far end face. The far end faces are inclined. Accordingly, when the intermediate transfer device 60 starts being attached in a state in which the claws are in contact with each other and the driven coupling 108 continues pressing in the drive coupling 118, a force in the rotation direction occurs on the drive coupling 118 and the driven coupling 108. At this time, in the present example, the contact between the drive claw 118c and the driven claw 108c is line contact. Hence, the friction force is weak so that the driven coupling 108 is rotated easily. As a result, the driven claws 108c can be fitted between the drive claws 118c, and therefore the drive coupling 118 and the driven coupling 108 can be coupled to each other.

A description is given of a verification test in reference to Table 2 and FIGS. 31A through 31D.

Figure 31A:
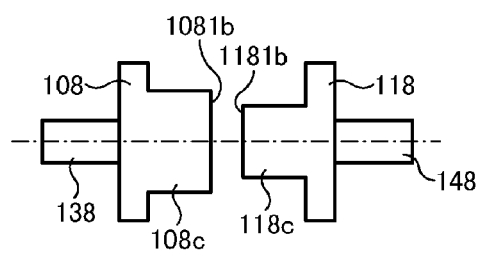
FIG. 31A is a cross-sectional view illustrating a configuration of the drive coupling and the driven coupling used in a verification test.
Figure 31B:
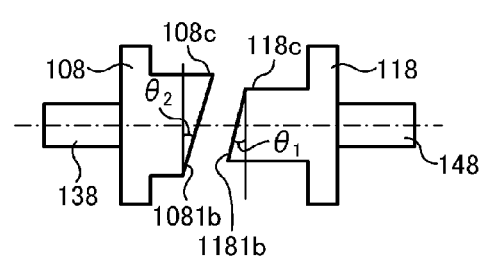
FIG. 31B is a cross-sectional view illustrating another configuration of the drive coupling and the driven coupling used in a verification test.
Figure 31C:
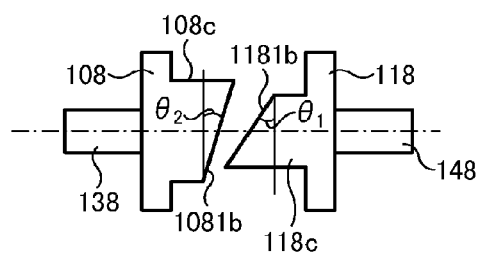
FIG. 31C is a cross-sectional view illustrating yet another configuration of the drive coupling and the driven coupling used in a verification test.
Figure 31D:
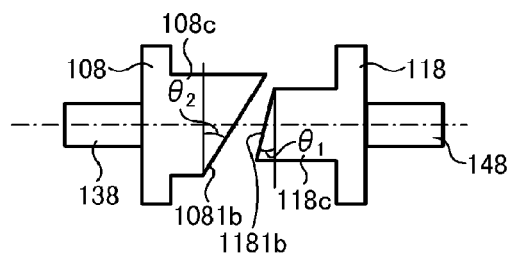
FIG. 31D is a cross-sectional view illustrating yet another configuration of the drive coupling and the driven coupling used in a verification test.

Table 2 below shows results of a verification test obtained by shifting the drive claws and the driven claws from each other for verification. FIG. 31A is a cross-sectional view illustrating a configuration of the drive coupling and the driven coupling used in the verification test. FIG. 31B is a cross-sectional view illustrating another configuration of the drive coupling and the driven coupling used in a verification test. FIG. 31C is a cross-sectional view illustrating yet another configuration of the drive coupling and the driven coupling used in a verification test. FIG. 31D is a cross-sectional view illustrating yet another configuration of the drive coupling and the driven coupling used in a verification test.

Configuration A in Table 2 below is a coupling that has far end faces of drive and driven claws, which are both normal to the axial direction, and that has the drive and driven claws with a formation area of 90 degrees as illustrated in FIG. 31A. Configuration B in Table 2 below is a coupling where the inclination angle θ1 of a far end face of a driven claw is the same as the inclination angle θ2 of a far end face of a drive claw as illustrated in FIG. 31B. Configuration C in Table 2 below is a coupling where the inclination angle θ1 of a far end face of a driven claw is different from the inclination angle θ2 of a far end face of a drive claw as illustrated in FIGS. 31C and 31D. Moreover, Configuration D in Table 2 below is the coupling 120 of the example previously illustrated in FIGS. 23A to 24D. Specifically, it is a coupling where the inclination angle θ1 of the far end face 1081b of the driven claw 108c is different from the inclination angle θ2 of the far end face 1181b of the drive claw 118c and where the drive claw 118c is about 2 mm smaller than the driven claw 108c.

Moreover, in the verification test, the couplings of Configurations A to C were checked on the presence or absence of a loss of synchronization of the adjustment motor 101, and ease of attachment and detachment of the intermediate transfer device 60 (ease of attachment and detachment of the unit). Moreover, the coupling of Configuration D was checked also on the allowable shaft misalignment in addition to the presence or absence of a loss of synchronization of the adjustment motor 101, and the ease of attachment and detachment of the unit. In terms of a loss of synchronization of the adjustment motor 101, the cam member was rotated a predetermined number of times. The case in which a loss of synchronization occurred was represented as "Poor". The case where a loss of synchronization did not occur was represented as "Good". Moreover, in terms of the ease of attachment and detachment of the unit, the driven coupling 108 was fixed to the driven shaft 138 so as to be unable to slide in the axial direction. The driven claw was set so as to hit a given position of the drive claw 118. The intermediate transfer device 60 was attached to the image forming apparatus 1. The ease of attachment and detachment of the unit at the time was checked. The case in which the intermediate transfer device 60 could not be attached was represented as "Poor". The case in which the intermediate transfer device 60 could be attached when being pressed in the axial direction with force was represented as "Acceptable". The case in which the intermediate transfer device 60 could be easily attached without applying much force was represented as "Good". Moreover, the shaft misalignment was adjusted to the maximum possible shaft misalignment amount of the image forming apparatus 1 between the drive shaft and the driven shaft to check on rotation. The case of successful normal drive was represented as "Good". The case of failed normal drive was represented as "Poor".

TABLE 2

| | Subject | | |
| --- | --- | --- | --- |
| Configuration | Prevention of Loss of Synchronization of Motor | Ease of Attachment/ Detachment of Unit | Allowance of Shaft Misalignment |
| A | Good | Poor | — |
| B | Good | Acceptable | — |
| C | Good | Good | — |
| D | Good | Good | Good |

As illustrated in Table 2, the adjustment motor 101 did not go out of synchronization in all of Configurations A through D. It is considered that the adjustment motor 101 did not lose synchronization since, in all of Configurations A to D, the formation areas of the drive claw and the driven claw are approximately 90 degrees, and the play between the drive claw and the driven claw is 2 mm or smaller.

Moreover, in the unit attachment performance, the coupling of Configuration A where both of the far end faces of the drive claw and the driven claw are normal to the axial direction was rated as "Poor" in the ease of attachment and detachment of the unit. The intermediate transfer device 60 could not be attached to the image forming apparatus. Since both of the far end faces of the drive and driven claws are normal to the axial direction, even if the intermediate transfer device 60 was pressed in while the driven claws were hitting the drive claws, the driven coupling and the drive coupling did not rotate. As a result, the driven claws did not enter between the drive claws. Even if the intermediate transfer device 60 was pressed in while the driven claws were hitting the drive claws, the intermediate transfer device 60 did not move in the axial direction. Therefore, the intermediate transfer device 60 could not be attached.

Moreover, the coupling of Configuration B was rated as "Acceptable" in the ease of attachment and detachment of the unit. When the intermediate transfer device 60 was pressed in with force from the condition where the driven claws were hitting the drive claws, the intermediate transfer device 60 could be attached to the apparatus body 9. In the coupling of Configuration B, the far end faces of the claws are inclined faces. Accordingly, when the intermediate transfer device 60 was pressed in while the driven claws were hitting the drive claws, a force occurred on the couplings in the rotation direction. The driven or drive coupling rotated. However, in the coupling of Configuration B, the inclination angles of the far end faces of the claws are the same, which resulted in surface contact between the far end faces. Hence, the friction force was large so that the drive or driven coupling did not rotate easily. As a result, unless the intermediate transfer device 60 was pressed in with force from the condition where the driven claws were hitting the drive claws, the drive or driven coupling did not rotate. Accordingly, it was not possible to allow the driven claws to enter between the drive claws, and to couple the drive coupling to the driven coupling. Hence, the ease of attachment and detachment of the unit resulted in "Acceptable".

By contrast, the couplings of Configurations C and D were rated as "Good" in the ease of attachment and detachment of the unit. The intermediate transfer device 60 could be easily attached without pressing in the intermediate transfer device 60 with force. This is because the couplings of Configurations C and D have a different inclination angle of the far end face of the drive claw from the inclination angle of the driven claw. As a result, when the driven claw hit the drive claw, the contact is line contact. Specifically, as illustrated in FIG. 31C, if the drive coupling has a greater inclination angle, the far end of the drive claw contacts the far end face of the driven claw. On the other hand, as illustrated in FIG. 31D, if the driven coupling has a greater inclination angle, the far end of the driven claw contacts the far end face of the drive claw. Consequently, the friction force between the drive claw and the driven claw is reduced. As a result, the drive or driven coupling rotated with a smaller force in the rotation direction than that of the coupling of Configuration B, and therefore the driven claws can enter between the drive claws. Consequently, the intermediate transfer device 60 could be attached to the apparatus body 9 without pressing in the intermediate transfer device 60 with a pressing force from the condition where the driven claws were hitting the drive claws. Hence, the ease of attachment and detachment of the unit was "Good".

Moreover, the coupling of Configuration D could allow a shaft misalignment of about 1 mm between the drive shaft 148 and the driven shaft 138. The shaft misalignment could be allowed.

Moreover, in the above description, both the far end faces of the drive claw 118c and the driven claw 108c are inclined faces that are inclined. However, one of the far end faces of the drive claw 118c and the driven claw 108c may be an inclined face. Moreover, one of the drive claw 118c and the driven claw 108c can have an inclined face whose height in the axial direction gradually decreases toward the rotation center. Consequently, when the drive claw 118c hits the driven claw 108c in the axial direction, the drive claw 118c comes into point contact with the driven claw 108c. With such a configuration, the friction force between the drive claw 118c and the driven claw 108c can be reduced. Accordingly, the intermediate transfer device 60 can be attached to the apparatus body 9 without applying a force from the condition where the driven claws 108c are hitting the drive claws 118c.

The above-described configurations are examples. This disclosure can achieve the following aspects effectively.

Aspect 1.

In Aspect 1, a drive transmitter includes a drive coupling and a driven coupling. The drive coupling is mounted on an end of a drive output shaft to which a driving force of a drive source is transmitted and including a drive claw projecting in an axial direction. The driven coupling is mounted on an end of a driven shaft, faces the drive coupling in the axial direction, and includes a driven claw projecting in the axial direction. A height of at least one of the drive claw and the driven claw in the axial direction gradually decreases from one end to the other end in a rotation direction of at least one of the drive coupling and the driven coupling. The drive claw and the driven claw come into either one of line contact and point contact with each other in the axial direction.

According to Aspect 1, when the driven claw (for example, the driven claw 108c) hits the drive claw (for example, the drive claw 118c) in the axial direction, the contact between the drive claw and the driven claw is line contact or point contact. Consequently, the friction force between the drive claw and the driven claw can be reduced as compared to the case in which the contact between the drive claw and the driven claw is surface contact. Hence, when the drive claw hits the driven claw, the driven coupling (for example, the driven coupling 108) can rotate relative to the drive coupling (for example, the drive coupling 118) without firmly pressing a drive target rotator (for example, the cam member 191) in the axial direction. Hence, the drive claws and the driven claws can be alternately placed. Consequently, the drive target rotator can be attached more easily than the case in which the opposing face (for example, the far end face 1181a) of the drive claw comes into surface contact with the opposing face (for example, the far end face 1081a) of the driven claw.

Aspect 2.

In Aspect 1, respective heights of the drive claw and the driven claw gradually decreases from one end to the other end in the rotation direction of the drive coupling and the driven coupling. The drive claw includes an opposing face opposed to the driven coupling and has an inclination angle inclined with respect to a virtual vertical plane normal to the axial direction of the drive claw. The driven claw includes an opposing face opposed to the drive coupling and has an inclination angle inclined with respect to a virtual vertical plane normal to the axial direction of the driven claw. The inclination angle of the drive claw is different from the inclination angle of the driven claw.

Accordingly, as described in the above examples, when the driven claw (for example, the driven claw 108c) hits the drive claw (for example, the drive claw 118c) in the axial direction, the contact between the drive claw and the driven claw is line contact. Consequently, the friction force between the drive claw and the driven claw can be reduced. Hence, the transfer device (for example, the intermediate transfer device 60) can be attached to the apparatus body (for example, the apparatus body 9) without applying a force from the condition where the driven claws are hitting the drive claws.

Aspect 3.

In Aspect 1 or Aspect 2, the drive claw includes a drive transmission portion to transmit the driving force to the driven claw in contact with the driven claw upon drive transmission. The driven claw includes a driven transmission portion to contact the drive transmission portion of the drive claw upon drive transmission. The drive transmission portion of the drive claw and the driven transmission portion of the driven claw are disposed in a direction perpendicular to the rotation direction.

Accordingly, a driving force can be transmitted by bringing the drive claw into surface contact with the driven claw so that the driving force can be preferably transmitted.

Aspect 4.

In Aspect 4, a driving device includes a drive source, and the drive transmitter according to claim 1 to transmit the driving force of the drive source to a drive target rotator. In the drive device, the drive transmitter (for example, the coupling 120) according to any of Aspects 1 through 3 is employed as the drive transmitter provided to the drive device.

Accordingly, the drive coupling can be easily coupled to the driven coupling.

Aspect 5.

In Aspect 4, the drive source is a stepping motor. The drive target rotator is a cam to linearly and reciprocally move a cam contact member coming into contact therewith by a biasing force applied by a biasing member. A play between the drive claw and the driven claw is set to 2 mm or smaller.

According to this, as described in the above examples, even if the cam (for example, the cam member 191) is rotated by the biasing force of the biasing member (for example, the fourth tension spring 176) or the like, the drive source (for example, the adjustment motor 101) can be prevented from going out of synchronization.

Aspect 6.

In Aspect 6, the image forming apparatus includes an apparatus body (for example, the apparatus body 9) and the above-described driving device included in the apparatus body.

Consequently, the drive coupling can be easily coupled to the driven coupling.

Aspect 7.

In Aspect 6, the image forming apparatus further includes an image bearer, a transfer device, and an adjuster. The image bearer forms an image on a surface thereof. The transfer device includes a transfer body onto which the image formed on the surface of the image bearer is transferred, a transfer member disposed facing the image bearer with the transfer body interposed therebetween, and a support shaft. The adjuster includes a swing member to hold the transfer member, swing while being swingably supported by the support shaft, and bring the transfer member into contact and separation by being swingably supported and swung by the support shaft, a cam to rotate by being driven by the drive device, and a slide assembly having one end contacting the cam by a biasing force applied by a biasing member, reciprocally moving with rotation of the cam, and swing the swing member.

According, the transfer member (for example, the primary transfer rollers 62S, 62Y, 62C, 62M, 62K) can be brought into contact and separation with the image bearer (for example, the photoconductors 20S, 20Y, 20C, 20M, 20K).

Aspect 8.

In Aspect 7, in the image forming apparatus (for example, the image forming apparatus 1), the image bearer (for example, the photoconductors 20S, 20Y, 20C, 20M, 20K) includes multiple color image bearers (for example, the photoconductors 20Y, 20C, 20M, 20K) to form respective color toner images in corresponding colors and a special color image bearer (for example, the photoconductor 20S) to form a special color toner image in either one of white and clear color, and the transfer member (for example, the primary transfer rollers 62S, 62Y, 62C, 62M, 62K) includes multiple color image transfer members (for example, the primary transfer rollers 62Y, 62C, 62M, 62K) and a special color image transfer member (for example, the primary transfer roller 62S). The image forming apparatus further includes a color image forming unit including multiple image forming units having the multiple color image bearers, and a special color image forming unit including the special color image bearer. The adjuster brings the special color transfer member into contact and separation with the special color image bearer.

According to this configuration, the special color image transfer member (for example, the special color primary transfer roller 62S) can be brought into contact and separation with the special color image bearer (for example, the photoconductor 20S).

Aspect 9.

In Aspect 8, the image forming apparatus (for example, the image forming apparatus 1) further includes a controller to control the slide assembly differently in a special color image forming mode to form the special color toner image and a non-special color image forming mode to form the respective color images. The controller controls the slide assembly such that the special color image transfer member contacts the special color image bearer in the special color image forming mode. The controller controls the slide assembly such that the special color image transfer member separates from the special color image bearer in the non-special color image forming mode.

According to this configuration, in the non-special color image forming mode, it is possible to prevent occurrence of a failure such as reverse transfer of an image formed on the transfer body onto the image bearer (for example, the photoconductor 20S) of the special color image forming unit (for example, the special color image forming unit 10S).

The above-described embodiments are illustrative and do not limit this disclosure. Thus, numerous additional modifications and variations are possible in light of the above teachings. For example, elements at least one of features of different illustrative and exemplary embodiments herein may be combined with each other at least one of substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of this disclosure may be practiced otherwise than as specifically described herein.

What is claimed is:

1. A drive transmitter comprising:
a drive coupling being mounted on an end of a drive output shaft to which a driving force of a drive source is transmitted and including a drive claw projecting in an axial direction; and
a driven coupling being mounted on an end of a driven shaft, facing the drive coupling in the axial direction, and including a driven claw projecting in the axial direction,
a height of at least one of the drive claw and the driven claw in the axial direction decreasing from one end to the other end in a rotation direction of at least one of the drive coupling and the driven coupling,
the drive claw and the driven claw coming into one of line contact and point contact, but not plane contact, with each other in the axial direction.

2. The drive transmitter according to claim 1,
wherein respective heights of the drive claw and the driven claw decrease from one end to the other end in the rotation direction of the drive coupling and the driven coupling,
wherein the drive claw includes an opposing face opposed to the driven coupling and has an inclination angle inclined with respect to a virtual vertical plane normal to the axial direction of the drive claw,
wherein the driven claw includes an opposing face opposed to the drive coupling and has an inclination angle inclined with respect to a virtual vertical plane normal to the axial direction of the driven claw, and
wherein the inclination angle of the drive claw is different from the inclination angle of the driven claw.

3. The drive transmitter according to claim 1,
wherein the drive claw includes a drive transmission portion to transmit the driving force to the driven claw in contact with the driven claw upon drive transmission,
wherein the driven claw includes a driven transmission portion to contact the drive transmission portion of the drive claw upon drive transmission, and
wherein the drive transmission portion of the drive claw and the driven transmission portion of the driven claw are disposed in a direction perpendicular to the rotation direction.

4. A driving device comprising:
a drive source; and
the drive transmitter according to claim 1 to transmit the driving force of the drive source to a drive target rotator.

5. The driving device according to claim 4,
wherein the drive source is a stepping motor,
wherein the drive target rotator is a cam to linearly and reciprocally move a cam contact member coming into contact therewith by a biasing force applied by a biasing member, and
wherein a play between the drive claw and the driven claw is set to 2 mm or smaller.

6. An image forming apparatus comprising:
an apparatus body; and
the driving device according to claim 4 included in the apparatus body.

7. The image forming apparatus according to claim 6, further comprising:
an image bearer to form an image on a surface thereof;
a transfer device including a transfer body onto which the image formed on the surface of the image bearer is transferred, a transfer member disposed facing the image bearer with the transfer body interposed therebetween, and a support shaft; and
an adjuster including:
a swing member to hold the transfer member, swing while being swingably supported by the support shaft, and bring the transfer member into contact and separation by being swingably supported and swung by the support shaft,
a cam to rotate by being driven by the drive device, and
a slide assembly having one end contacting the cam by a biasing force applied by a biasing member, reciprocally moving with rotation of the cam, and swing the swing member.

8. The image forming apparatus according to claim 7,
wherein the image bearer includes multiple color image bearers to form respective color toner images in corresponding colors and a special color image bearer to form a special color toner image in either one of white and clear color, and the transfer member includes multiple color image transfer members and a special color image transfer member,
wherein the image forming apparatus further includes:
a color image forming unit including multiple image forming units having the multiple color image bearers; and
a special color image forming unit including the special color image bearer, and
wherein the adjuster brings the special color image transfer member into contact and separation with the special color image bearer.

9. A drive transmitter comprising:
a drive coupling being mounted on an end of a drive output shaft to which a driving force of a drive source is transmitted and including a drive claw projecting in an axial direction; and
a driven coupling being mounted on an end of a driven shaft, facing the drive coupling in the axial direction, and including a driven claw projecting in the axial direction,
wherein respective heights of the drive claw and the driven claw decrease from one end to the other end in a rotation direction of the drive coupling and the driven coupling,
wherein the drive claw includes an opposing face opposed to the driven coupling and has an inclination angle inclined with respect to a virtual vertical plane normal to the axial direction of the drive claw,
wherein the driven claw includes an opposing face opposed to the drive coupling and has an inclination angle inclined with respect to a virtual vertical plane normal to the axial direction of the driven claw, and
wherein the inclination angle of the drive claw is different from the inclination angle of the driven claw.

10. The drive transmitter according to claim 9,
wherein the drive claw includes a drive transmission portion to transmit the driving force to the driven claw in contact with the driven claw upon drive transmission,
wherein the driven claw includes a driven transmission portion to contact the drive transmission portion of the drive claw upon drive transmission, and wherein the drive transmission portion of the drive claw and the driven transmission portion of the driven claw are disposed in a direction perpendicular to the rotation direction.

11. A driving device comprising:

a drive source; and the drive transmitter according to claim 9 to transmit the driving force of the drive source to a drive target rotator.

12. The driving device according to claim 11, wherein the drive source is a stepping motor, wherein the drive target rotator is a cam to linearly and reciprocally move a cam contact member coming into contact therewith by a biasing force applied by a biasing member, and wherein a play between the drive claw and the driven claw is set to 2 mm or smaller.

13. An image forming apparatus comprising:

an apparatus body; and the driving device according to claim 11 included in the apparatus body.

14. The image forming apparatus according to claim 13, further comprising:

an image bearer to form an image on a surface thereof;

a transfer device including a transfer body onto which the image formed on the surface of the image bearer is transferred, a transfer member disposed facing the image bearer with the transfer body interposed therebetween, and a support shaft; and an adjuster including:

a swing member to hold the transfer member, swing while being swingably supported by the support shaft, and bring the transfer member into contact and separation by being swingably supported and swung by the support shaft, a cam to rotate by being driven by the drive device, and a slide assembly having one end contacting the cam by a biasing force applied by a biasing member, reciprocally moving with rotation of the cam, and swing the swing member.

15. The image forming apparatus according to claim 14, wherein the image bearer includes multiple color image bearers to form respective color toner images in corresponding colors and a special color image bearer to form a special color toner image in either one of white and clear color, and the transfer member includes multiple color image transfer members and a special color image transfer member, wherein the image forming apparatus further includes:

a color image forming unit including multiple image forming units having the multiple color image bearers; and a special color image forming unit including the special color image bearer, and wherein the adjuster brings the special color image transfer member into contact and separation with the special color image bearer.

* * * * *